(12) United States Patent
Matsumoto

(10) Patent No.: US 7,885,005 B2
(45) Date of Patent: Feb. 8, 2011

(54) EYEPIECE SYSTEM AND OPTICAL DEVICE

(75) Inventor: Miho Matsumoto, Tokyo (JP)

(73) Assignee: Nikon Corporation, Tokyo (JP)

( * ) Notice: Subject to any disclaimer, the term of this patent is extended or adjusted under 35 U.S.C. 154(b) by 0 days.

(21) Appl. No.: 12/817,582

(22) Filed: Jun. 17, 2010

(65) Prior Publication Data

US 2010/0254005 A1 Oct. 7, 2010

Related U.S. Application Data

(63) Continuation of application No. PCT/JP2008/073035, filed on Dec. 18, 2008.

(30) Foreign Application Priority Data

Dec. 20, 2007 (JP) ............................. 2007-329358

(51) Int. Cl.
*G02B 5/18* (2006.01)
(52) U.S. Cl. .................. 359/576; 359/569; 359/643
(58) Field of Classification Search .................. None
See application file for complete search history.

(56) References Cited

U.S. PATENT DOCUMENTS

| 5,029,010 | A | * | 7/1991 | Shiraishi ............... 348/347 |
| 5,557,464 | A | | 9/1996 | Imaizumi |
| 6,130,785 | A | | 10/2000 | Abe et al. |
| 6,141,159 | A | | 10/2000 | Nishio |
| 6,144,502 | A | | 11/2000 | Hayakawa et al. |
| 2001/0009476 | A1 | * | 7/2001 | Iizuka ................ 359/566 |
| 2001/0036019 | A1 | | 11/2001 | Fukumoto |
| 2003/0202254 | A1 | | 10/2003 | Kanai |
| 2006/0171031 | A1 | | 8/2006 | Suzuki |

FOREIGN PATENT DOCUMENTS

| CN | 1316665 A | 10/2001 |
| CN | 1860387 A | 11/2006 |
| EP | 1 677 128 A1 | 7/2006 |
| EP | 1 830 204 A1 | 9/2007 |
| EP | 1 830 205 A1 | 9/2007 |
| JP | 06-109983 A | 4/1994 |
| JP | 8-36140 A | 2/1996 |
| JP | 11-30757 | 2/1999 |
| JP | 11-258525 A | 9/1999 |
| JP | 2001-281560 A | 10/2001 |

(Continued)

*Primary Examiner*—Arnel C Lavarias
(74) *Attorney, Agent, or Firm*—Miles & Stockbridge P.C.

(57) ABSTRACT

An eyepiece system has a lens group S1 in which a lens L1 having a negative refractive index and refractive power and a lens L2 having a positive refractive index and refractive power are joined, so that the lens group S1 as a whole has a positive refractive index and refractive power; and a multi-layer (stacked) diffraction optical element PF. In an optical system positioned between an image surface I and an eye point EP, the position of a diffraction plane on the optical axis is between EF in FIG. 1. In FIG. 1, EF is the range in which the value ra of the ratio between a distance (DH2) between the diffraction plane (C) and a principal point (H2) near the diffraction plane and a distance (DH1H2) between principal points is 0.5 or less in both directions from the principal points H1, H2.

11 Claims, 22 Drawing Sheets

FOREIGN PATENT DOCUMENTS

| | | |
|---|---|---|
| JP | 2003-315687 A | 11/2003 |
| JP | 2005-107298 A | 4/2005 |
| JP | 2007-011066 A | 1/2007 |
| JP | 2007-047588 A | 2/2007 |
| WO | WO 2005/031404 A1 | 4/2005 |

* cited by examiner

EYEPIECE SYSTEM AND OPTICAL DEVICE

This is a continuation of PCT International Application No. PCT/JP2008/073035, filed on Dec. 18, 2008, which is hereby incorporated by reference. This application also claims the benefit of Japanese Patent Application No. 2007-329358, filed in Japan on Dec. 20, 2007, which is hereby incorporated by reference.

TECHNICAL FIELD

The present invention relates to an eyepiece system used in binoculars, telescopes, microscopes, or other optical devices; and to an optical device in which the eyepiece is used.

TECHNICAL BACKGROUND

Eyepieces used in binoculars, telescopes, microscopes, or other such optical devices are used as an optical system for enlarging a real image formed by an objective in order for the image to be viewed.

An important attribute relating to the performance of an eyepiece system is a large angle of field, but increasing the angle of field makes the eyepiece system susceptible to lateral chromatic aberration and various other aberrations, and correcting such aberrations is a serious problem.

Diffraction optical elements that differ significantly in configuration from a conventional optical lens have recently been used for such purposes as reducing these various aberrations in a variety of optical systems. Lens systems that use diffraction optical elements to minimize various aberrations, particularly lateral chromatic aberration, have been proposed in eyepiece systems as well (see, e.g., Patent Document 1).

Patent Document 1: U.S. Pat. No. 6,130,785

DISCLOSURE OF THE INVENTION

Problems to be Solved by the Invention

The grating pitch (interval between diffraction grating grooves) of the diffraction grating must usually be reduced in order to manufacture a diffraction optical element having a short focal length and high power. The diffraction optical element is therefore difficult to manufacture, and the potential for flare increases.

The various aberrations of optical systems in which a diffraction optical element having a long focal length and low power is used are such that the potential for lateral chromatic aberration is increased.

An object of the present invention is to provide an eyepiece system in which lateral chromatic aberration and various other aberrations are satisfactorily corrected, manufacture is relatively uncomplicated, and flare can be minimized; and to provide an optical device in which the eyepiece system is used.

Means to Solve the Problems

According to a first aspect of the present invention, there is provided an eyepiece system comprising a basic lens group in which a lens having a negative refractive power and a lens having a positive refractive power are joined, the basic lens group as a whole having a positive refractive power; and at least one diffraction optical element; the diffraction optical element including a first diffractive element piece having a first diffractive optical surface; and a second diffractive element piece having a second diffractive optical surface, the first diffractive element piece and the second diffractive element piece being arranged so that the first diffractive optical surface and the second diffractive optical surface face each other; and the following conditional expressions being satisfied:

when $DH1 \leq DH2$, $DH1/DH1H2 \leq 0.5$ when $DH1 > DH2$, $DH2/DH1H2 \leq 0.5$ where $DH1H2$ is the absolute value of the distance on an optical axis between a front principal point and a rear principal point of the eyepiece system positioned between an image surface and an eye point; $DH1$ is the absolute value of a distance on the optical axis between a front principal point and the first diffractive optical surface of the eyepiece system positioned between the image surface and the eye point; and $DH2$ is the absolute value of a distance on the optical axis between a rear principal point and the first diffractive optical surface of the eyepiece system positioned between the image surface and the eye point.

In the present specification, the expression "arranged so that the first diffractive optical surface and the second diffractive optical surface face each other" corresponds to a broad concept that includes a state in which "the first diffractive optical surface and the second diffractive optical surface are arranged so as to be in contact with each other," and a state in which "the first diffractive optical surface and the second diffractive optical surface are arranged so as to face each other across a gap.

According to a second aspect of the present invention, there is provided an optical device comprising the eyepiece system according to the first aspect.

ADVANTAGEOUS EFFECTS OF THE INVENTION

According to the present invention, there can be provided an eyepiece system in which lateral chromatic aberration and various other aberrations are satisfactorily corrected, the eyepiece system being provided with a diffraction optical element that is relatively straightforward to manufacture and has minimized flare, and an optical device that is provided with the eyepiece system.

EXPLANATION OF NUMERALS AND CHARACTERS

| | |
|---|---|
| I | image surface |
| PF | diffraction optical element |
| PF1 | first diffractive element piece |
| PF2 | second diffractive element piece |
| C | diffraction optical element surface (first diffractive optical surface) |
| H1 | front principal point |
| H2 | rear principal point |
| CO | position at which the diffraction optical element surface crosses the optical axis |
| L1, L5 | lenses having a negative refractive power |
| L2, L3, L4, L6, L7 | lenses having a positive refractive power |
| S1, S2 | cemented lenses composed of a lens having a negative refractive power and a lens having a positive refractive power |
| EP | eye point |
| 20 | binoculars |
| 21 | objective |
| 22 | erecting optical system |
| 23 | eyepiece |

DESCRIPTION OF THE PREFERRED EMBODIMENTS

As a result of concentrated investigation aimed at overcoming the problems described above, the inventors discovered that the abovementioned problems could be solved based on the relationship between the positions of both principal points on the optical axis and the position of the diffraction optical element surface. The inventors also discovered that the above-mentioned problems could be overcome by a more appropriate lens configuration. Embodiments of the present invention will be described with reference to the drawings.

Figure 1A:
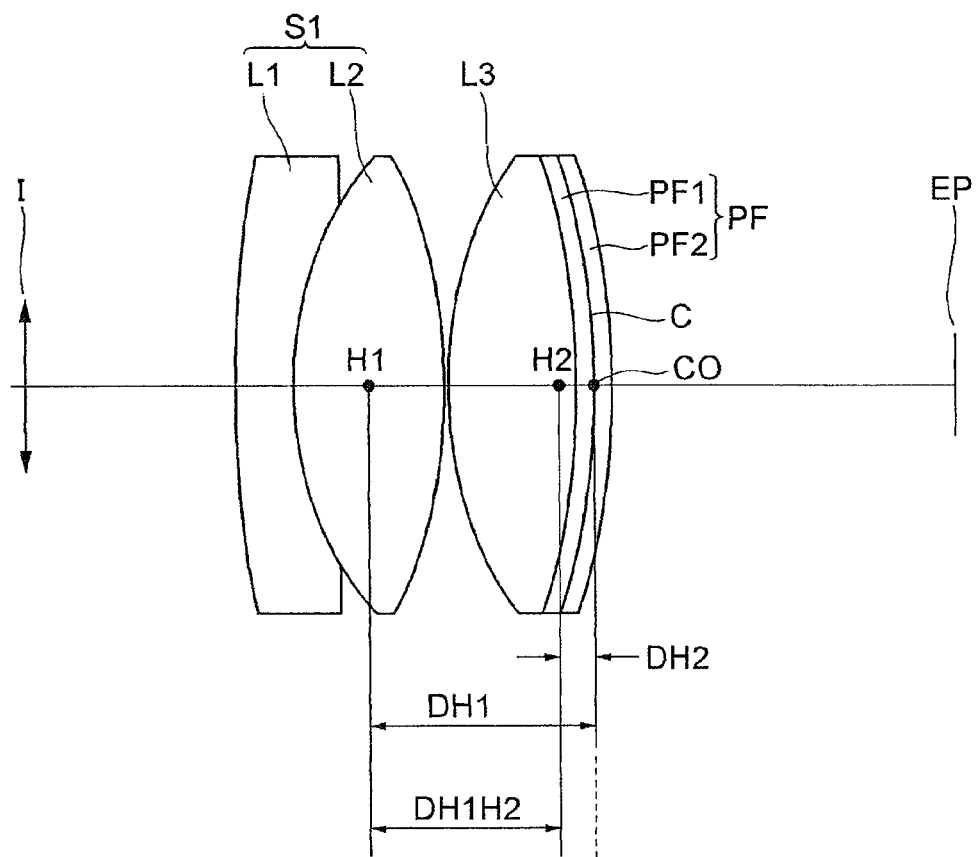
FIG. 1 is a schematic view showing the eyepiece system according to an embodiment.
Figure 1B:
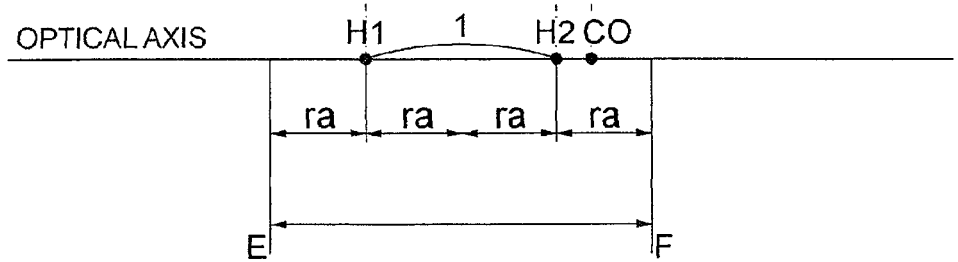

FIGS. 1A and 1B are schematic views showing the eyepiece system as an embodiment of the present invention, and depict the overall eyepiece system and the conditional expressions describing the relationship between the positions of both principal points on the optical axis and the position of the first diffractive optical surface.

The eyepiece system shown in FIG. 1A is provided with a lens group S1 in which a lens L1 having a negative refractive power and a lens L2 having a positive refractive power are joined, the lens group S1 as a whole having a positive refractive power; and at least one diffraction optical element PF.

In FIG. 1, the diffraction optical element PF is shown larger than the actual dimensions thereof in the direction of the optical axis for the sake of convenience. Furthermore, out of consideration for convenience in creating the diagram, since FIG. 1 is a schematic diagram similar to Example 2 described hereinafter, a lens L3 having a positive refractive power is shown, but is not necessarily required.

As shown in FIG. 1A, in the present embodiment, the diffraction optical element PF used in the eyepiece system is composed of two diffractive element pieces made of different optical materials, and has a first diffractive element piece PF1 having a first diffractive optical surface that is provided with a plurality of diffraction grating grooves not shown in the drawing, and a second diffractive element piece PF2 having a second diffractive optical surface that is provided with a plurality of diffraction grating grooves not shown in the drawing. The first diffractive element piece PF1 and the second diffractive element piece PF2 are arranged so that the first diffractive optical surface and second diffractive optical surface face each other.

In the present embodiment, the eyepiece system also has a characteristic configuration as regards the relationship between a front principal point H1 and a rear principal point H2 of the eyepiece system at the position of the first diffractive optical surface of the diffraction optical element. This characteristic configuration will next be described.

The schematic view of FIG. 1A shows a configuration in which the first diffractive optical surface and second diffractive optical surface (described hereinafter) for which example data are disclosed are bonded together in contact with each other, as a result of which the diffraction optical element surface C shown in FIG. 1A is a first diffractive optical surface C.

In the present specification, the specifications described below are established for the optical system positioned between an image surface I and an eye point EP. As shown in FIG. 1A, the absolute value of the distance on the optical axis between a front principal point H1 and a rear principal point H2 is defined as DH1H2. For the sake of convenience, DH1H2 will also be referred to hereinafter as the distance between principal points. The absolute value of the distance on the optical axis between the front principal point H1 and the first diffractive optical surface C is defined as DH1. In other words, the absolute value of the distance between the front principal point H1 and the position CO at which the first diffractive optical surface C crosses the optical axis is defined as DH1. The absolute value of the distance on the optical axis between the rear principal point H2 and the first diffractive optical surface C is defined as DH2. In other words, the absolute value of the distance on the optical axis between the rear principal point H2 and the position CO at which the first diffractive optical surface C crosses the optical axis is defined as DH2.

Given the above definitions, the first diffractive optical surface C in the eyepiece system in the present embodiment is positioned on the optical axis so as to satisfy the conditional expressions (1) and (2) below.

when $DH1 \leq DH2$, $$DH1/DH1H2 \leq 0.5 \quad (1)$$

when $DH1 > DH2$, $$DH2/DH1DH2 \leq 0.5 \quad (2)$$

The conditional expressions (1) and (2) above are highly significant, and will therefore be described in some detail hereinafter. These expressions can be separated into the expressions (3), (4), (5-1), and (5-2) below when expressed in more generic terms.

when $DH1 \leq DH2$ $$DH1/DH1H2 = ra1 \quad (3)$$

when $DH1 > DH2$ $$DH2/DH1H2 = ra2 \quad (4)$$

Therefore, $$0 \leq ra1 \leq 0.5 \quad (5\text{-}1)$$

$$0 \leq ra2 \leq 0.5 \quad (5\text{-}2)$$

When expressions (3) and (4) are combined into a single descriptive conditional expression, and ra1 or ra2 is designated as ra, the descriptive conditional expression is an expression indicating the value of the ratio between the absolute value of the distance on the optical axis between the first diffractive optical surface and the closer of the principal points to the first diffractive optical surface, and the absolute value of the distance between the principal points; and the expression shows the value of this ratio to be ra. Since this explanation is lengthy, ra can also be described as being "the value of the ratio of the distance between the diffraction surface and the closer of the principal points to the diffraction surface, and the distance between the principal points," by shortening the term "first diffractive optical surface" to "diffraction surface." The expressions (5-1) and (5-2) indicate the specific allowable value for the ratio ra, which is 0.5. The value ra of this ratio is also referred to in the present specification as an approximation coefficient.

The meaning of the conditional expressions (the expressions (1) and (2) described above) is expressed by the schematic view of FIG. 1B when the point indicating the position of the first diffractive optical surface C on the optical axis, i.e., the position at which the first diffractive optical surface C crosses the optical axis, is indicated as CO. In other words, when the distance between principal points in the front and rear directions on the optical axis from each of the front principal point H1 and the rear principal point H2 is 1, a region that is a factor of ra is allowed as the position of CO. Consequently, the first diffractive optical surface is required to be within the range indicated by EF in FIG. 1B. In short, the first diffractive optical surface C must be either in the region 0.5 times the distance between principal points forward from the front principal point on the optical axis, the region between both principal points, or the region 0.5 times the distance between principal points rearward from the rear principal point.

In essence, the value of the ratio of the distance between the diffraction surface and the closer of the principal points to the diffraction surface and the distance between the principal points must be 0.5 or lower. The theoretical lower limit value is 0 in order to form the expression, but the value of the ratio may be 0. The upper limit value of this ratio has one significant digit. In other words, the value is rounded to the second digit after the decimal place. The calculated value thereof is 0.54 or less.

As described hereinafter, in the examples, data are shown in which the calculated value of the approximation coefficient is obtained as a percentage by multiplying the value obtained by expression (3) or (4) by 100. This item of data is indicated in the examples by the reference symbol ra.

Data are presented in the description of the embodiments to show the reason that a value of 0.5 or lower is derived as the value of ra, but when this value exceeds 0.5, the diffraction optical element may have too high a power and too short a focal length in certain lens systems. The grating pitch of the diffraction optical element is thus undesirably.

Specifically, the grating pitch of the diffraction optical element must not be less than 20 μm for the sake of manufacturing, i.e., so as not to create undue complication from a manufacturing standpoint. The grating pitch of the diffraction optical element may be 27 μm or greater.

In the present embodiment, the eyepiece system is provided with a lens in which a lens having a negative refractive power and a lens having a positive refractive power are joined, i.e., cemented, the lens as a whole having a positive refractive power. In other words, a so-called achromatic lens is provided in the present embodiment.

The use of a cemented lens in the present embodiment helps to efficiently and satisfactorily correct lateral chromatic aberration by correcting curvature of field and astigmatism. Such correction enables chromatic aberration to be satisfactorily corrected even when the diffraction optical element has relatively low power, and helps to eliminate the need for the diffraction optical element to have a fine pitch, as previously described.

In the present embodiment as described above, through the use of a cemented lens, and by setting a value of 0.5 or less for the ratio of the distance between principal points and the distance between the closer of the principal points to the diffraction surface and the diffraction surface, an eyepiece system can be arrived at having the characteristic of satisfactory lateral chromatic aberration and various other aberrations without having an excessively powerful diffraction optical element.

Not having an excessively powerful diffraction optical element, i.e., enabling the power of the diffraction optical element to be low, means that there is no need for the diffraction grating to have a fine pitch. Therefore, it is possible to use a diffraction optical element that is relatively easy to manufacture and has minimal flare. It is accordingly possible to provide an eyepiece system adapted for a variety of applications, in which various aberrations, particularly lateral chromatic aberration and the like, are satisfactorily corrected, and to provide an optical device in which the eyepiece system is used.

The diffraction optical element is provided with a diffractive optical surface in which a grating structure of fine grooves or slits is formed in concentric circles, and the properties thereof are such that light incident on the diffractive optical surface diffracts in a direction determined by the grating pitch (interval between diffraction grating grooves) and the wavelength of the incident light.

This type of diffraction optical element is used in lenses and the like, e.g., for collecting a particular order of diffracted light to a single point. The wavelength-dependent refractive power characteristic of a normal refractive lens varies by a greater amount with shorter wavelengths, but the refractive power characteristic in a diffraction optical element such as described above varies in linear fashion. Furthermore, the characteristics of a refractive lens vary according to the lens material, but the characteristics of a diffraction optical element do not depend on the lens material. Utilizing this characteristic, pronounced achromatic effects are obtained when a plurality of refractive materials and diffraction surfaces is appropriately combined. Consequently, the use of such a diffraction optical element enables lateral chromatic aberration and various other aberrations to be satisfactorily corrected.

In the present embodiment, as previously described, the diffraction optical element of the eyepiece system is composed of two diffractive element pieces, each of which being composed of different optical materials; and has a first diffractive element piece having a first diffractive optical surface, and a second diffractive element piece having a second diffractive optical surface. The first diffractive element piece and second diffractive element piece are arranged so that the first diffractive optical surface and second diffractive optical surface face each other.

In other words, since the diffraction optical element is of a "multi-layer" (stacked) configuration in which diffractive optical surfaces are formed in two diffractive element pieces composed of different optical materials, and the diffractive optical surfaces are arranged so as to face each other, the diffraction efficiency can be increased in a wide wavelength range from the g-line (wavelength $\lambda$=435.835 nm) to the C-line (wavelength $\lambda$=656.273 nm).

The eyepiece system in which this diffraction optical element is used can thus be used in a wide wavelength range (wavelength $\lambda$=435.835 nm to 656.273 nm).

The diffraction efficiency is generally indicated by the ratio $\eta(=Im/Io\times100(\%))$ of the intensity Io of the incident light and the intensity Im of the m-order diffracted beam when an m-order diffracted beam is used, but when the value of the diffraction efficiency is mentioned in the present specification, the ratio $\eta(=I1/Io\times100(\%))$ of the intensity Io of the incident light and the intensity I1 of a first-order diffracted beam will be given, referring to a case in which a first-order diffracted beam is used.

In the diffraction optical element used in the eyepiece system, the first diffractive optical surface and second diffractive optical surface arranged so as to face each other as previously described may be arranged so as to be in contact with each other. In other words, the diffraction grating grooves of the two diffractive element pieces are bonded together to form a bonded multi-layer diffraction optical element.

The reason for adopting such a configuration is that a bonded multi-layer diffraction optical element can be manufactured by a simpler process than a separated diffraction optical element in which the diffractive element pieces are arranged close to each other across a gap, and mass production efficiency or productivity can be improved. An eyepiece system having a diffraction optical element in which the first diffractive optical surface and second diffractive optical surface arranged so as to be in contact with each other, i.e., a bonded multi-layer diffraction optical element, has the advantage of greater ease of manufacture.

For the reasons described above, the bonded multi-layer diffraction optical element has 90% or higher diffraction efficiency in a wide wavelength range (wavelength $\lambda$=435.835 nm to 656.273 nm).

Furthermore, the diffraction optical element used in the eyepiece system may be configured so that at least one of the first diffractive element piece and the second diffractive element piece is composed of a UV-curable resin. This configuration is adopted merely to increase mass production properties or productivity.

Specifically, the diffraction optical element can be manufactured using ordinary glass, or thermoplastic, thermosetting, or UV-curable resins that can be injection molded to form the diffractive element pieces. When glass is used, the diffractive optical surfaces are formed by grinding and polishing. When a thermoplastic or thermosetting resin is used, the diffraction grating surfaces are formed by injection molding or another molding method using a die in which diffraction grating grooves are formed. A manufacturing method may then be employed in which a UV-curable resin is introduced dropwise onto the diffraction grating surfaces and cured by ultraviolet irradiation.

This manufacturing method obviates the need for diffraction grating surfaces to be separately created for the two diffractive element pieces and then moved into position; therefore, productivity and mass production properties can be enhanced.

Two different UV-curable resins may be used to manufacture the diffractive element pieces when the diffraction optical element is manufactured. In such instances, a die in which diffraction grating grooves are formed is pressed onto one UV-curable resin that has been introduced dropwise onto a substrate, and ultraviolet rays are directed from the opposite direction of the die to form one diffractive element piece having a diffraction grating surface.

The die is then removed, and the other UV-curable resin is introduced dropwise onto the UV-cured diffraction grating surface. The other UV-curable resin is then cured by directing ultraviolet rays to the other UV-curable resin that has been introduced dropwise, and the other diffractive element piece is formed.

This manufacturing method enables the diffractive optical surfaces to be manufactured using a single die, and obviates the need for diffraction grating surfaces to be separately created for the two diffractive element pieces and then moved into position.

According to this manufacturing method, furthermore, since the diffraction optical element can be manufactured merely by twice performing the operation of dropwise introduction and curing of the UV-curable resin, mass production properties and productivity can be even further enhanced.

In the present embodiment, the diffraction optical element used in the eyepiece system may have a bonded multi-layer structure, and may satisfy the following conditional expressions (6), (7), (8), and (9).

$$nd1 \leq 1.54 \quad (6)$$

$$(nF1-nC1) \geq 0.0145 \quad (7)$$

$$nd2 \leq 1.55 \quad (8)$$

$$(nF2-nC2) \leq 0.013 \quad (9)$$

The reference symbols in the conditional expressions shown above are explained below.

nd1: The d-line (wavelength $\lambda$=587.562 nm) refractive index of the material of the diffractive element piece having the lower refractive index and higher dispersion of the two diffractive element pieces in the diffraction optical element.

nF1: The F-line (wavelength $\lambda$=486.133 nm) refractive index of the material of the diffractive element piece having the lower refractive index and higher dispersion of the two diffractive element pieces in the diffraction optical element.

nC1: The C-line (wavelength $\lambda$=656.273 nm) refractive index of the material of the diffractive element piece having the lower refractive index and higher dispersion of the two diffractive element pieces in the diffraction optical element.

nd2: The d-line (wavelength λ=587.562 nm) refractive index of the material of the diffractive element piece having the higher refractive index and lower dispersion of the two diffractive element pieces in the diffraction optical element.

nF2: The F-line (wavelength λ=486.133 nm) refractive index of the material of the diffractive element piece having the higher refractive index and lower dispersion of the two diffractive element pieces in the diffraction optical element.

nC2: The C-line (wavelength λ=656.273 nm) refractive index of the material of the diffractive element piece having the higher refractive index and lower dispersion of the two diffractive element pieces in the diffraction optical element.

The conditional expressions (6), (7), (8), and (9) specify the d-line refractive index and the dispersion with respect to the F-line and C-line of the materials (nF−nC), i.e., the two different resins, of the two diffractive element pieces that constitute the diffraction optical element of the eyepiece system (where nF is the refractive index with respect to the F-line, and nC is the refractive index with respect to the C-line). Since these conditional expressions relate to the optical performance of the resins used for the diffraction optical element, the conditional expressions specify optical characteristics of the resins in the cured state.

In essence, the aforementioned conditional expressions mean that a resin 1 having the optical characteristics of a low refractive index and high dispersion, and a resin 2 having the optical characteristics of a higher refractive index and lower dispersion than at least the resin 1 are used as the two types of resins, and the resins satisfy the optical characteristics described above after being cured.

In the present embodiment, the eyepiece system satisfies the conditional expressions described above, whereby two diffractive element pieces having improved performance and being composed of different materials can be bonded together to form a diffractive optical surface, and 90% or higher diffraction efficiency can thereby be realized over a wide wavelength range from the g-line to the C-line.

When the upper limits or lower limits of the conditional expressions (6), (7), (8) and (9) are not satisfied, it is difficult for 90% or higher diffraction efficiency to be obtained in a wide wavelength range by the diffraction optical element in the eyepiece system of the present embodiment. The diffraction efficiency referred to herein is the ratio of the intensity of the incident light and the intensity of the first-order diffracted beam, as previously described.

For confirmation, the equation for determining the diffraction efficiency is described below.

Diffraction efficiency is expressed by the equations (10) and (11) below, where ηm is the diffraction efficiency of the m-order diffracted beam.

$$\eta m = \{\sin(a-m)\pi/(a-m)\pi\}^2 \qquad (10)$$

The reference symbols in the equations (10) and (11) are described below.

$$a = \{(n1-1)d1 - (n2-1)d2\}/\lambda \qquad (11)$$

m: order of diffraction d1: diffraction grating height of one of the diffractive element pieces forming the diffraction grating surface (diffractive optical surface)

d2: diffraction grating height of the other diffractive element piece forming the diffraction grating surface (diffractive optical surface)

n1: refractive index of the material of one of the diffractive element pieces forming the diffraction grating surface (diffractive optical surface)

n2: refractive index of the material of the other diffractive element piece forming the diffraction grating surface (diffractive optical surface)

λ: wavelength

The resins used as the optical materials, and the method for manufacturing the bonded multi-layer diffraction optical element in which the resins are used, are described in, e.g., European Patent Application Publication Nos. 1830204 and 1830205.

The diffraction optical element has, for example, an outside diameter of 50 mm and a grating height of 20 μm, and a grating pitch of 3.5 mm near the center and 0.17 mm near the outer circumference, the grating pitch tending to decrease toward the outer circumference from the center.

Two different UV-curable resins are used in the diffraction optical elements described in the examples. The diffraction grating height is 20.05 μm. The dimensions in other locations of the diffraction optical element are not described, but the tendency of the grating pitch to decrease from the center outward, and other aspects of the structure of the diffraction optical element are the same as in the diffraction optical element of the example described above. In the present embodiment, the diffraction efficiency of the diffraction optical element is 98% at the g-line (wavelength λ=435.835 nm), 98% at the F-line (wavelength λ=486.133 nm), 100% at the d-line (wavelength λ=587.562 nm), and 98% at the C-line (wavelength λ=656.273 nm).

Four types of eyepiece systems will be briefly described below as specific embodiments. To avoid redundant description, the lens configurations will be described in order of increasing complexity. The positions of the lenses will be described in order from the image surface (image formation position), but the diffraction optical element may be in any position provided that the approximation coefficient ra is 0.5 or less. The description of the order in which the lenses are arranged in the brief description of each group therefore does not include the position of the diffraction optical element.

In the brief description of the embodiments and the data of the examples, the approximation coefficient ra is indicated as a percentage, as described above. In the data of the examples, ra is sometimes indicated in a half-width notation, but the meaning thereof is the same. Other reference symbols are also noted in half-width characters in the examples for the sake of convenience, but the same reference symbols have the same meaning whether appearing in full-width or half-width characters. The specific position of the diffraction optical element, the associated data, and other details are described in each example.

(First Group of Eyepiece Systems (First Group))

Figure 2:
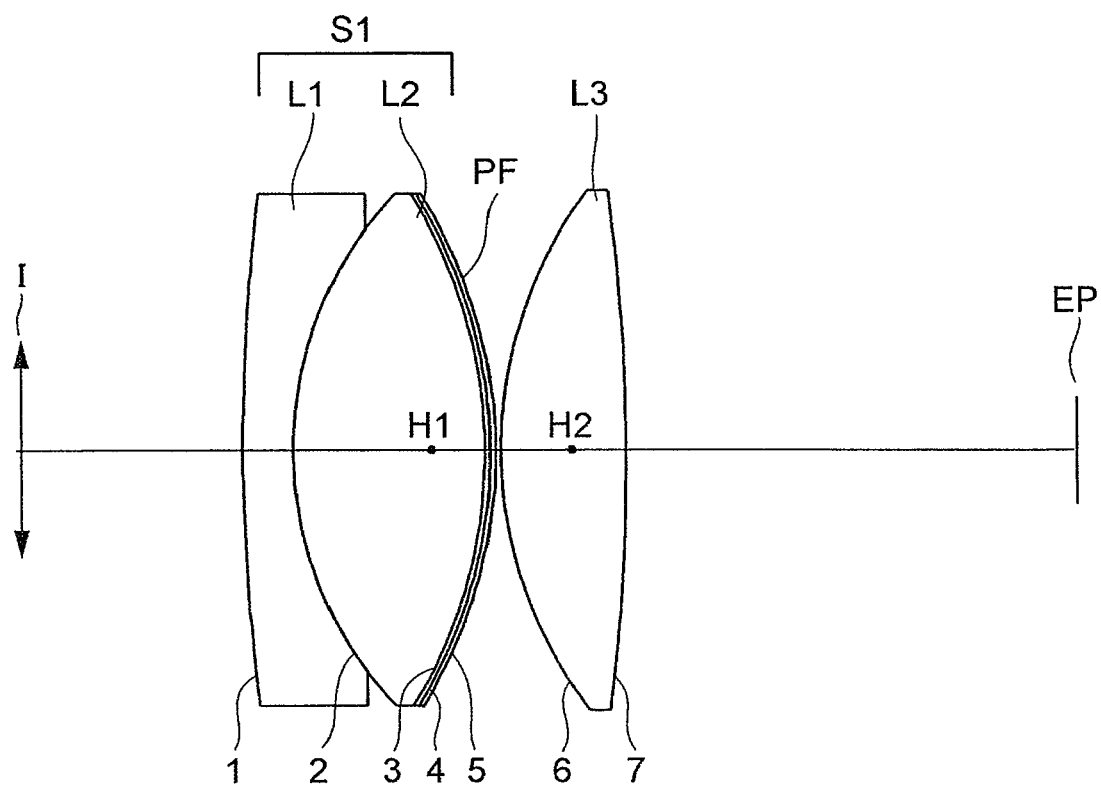
FIG. 2 shows the lens configuration of the eyepiece system in the first example (Example K-1)
Figure 3:
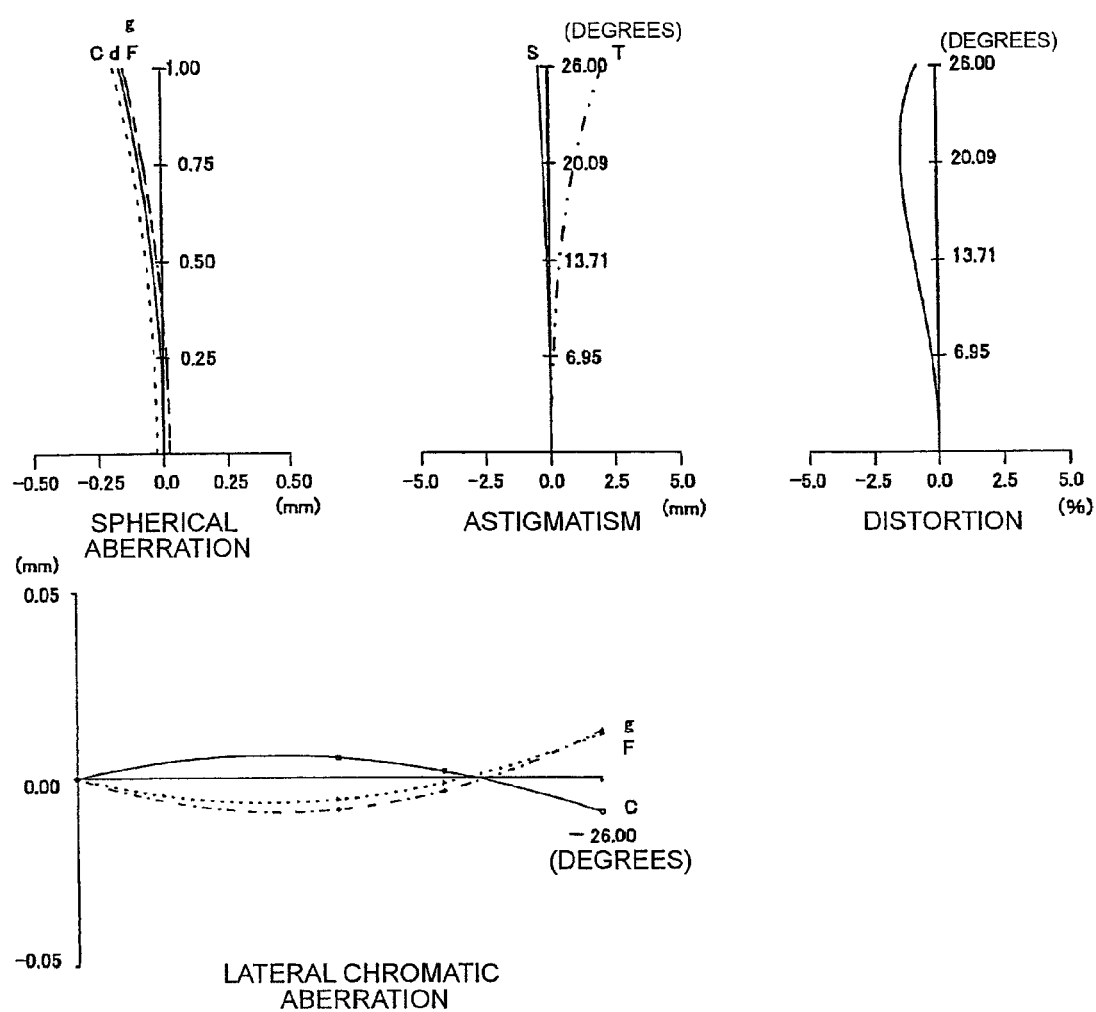
FIG. 3 shows graphs of various aberrations for the eyepiece system in the first example (Example K-1)
Figure 4:
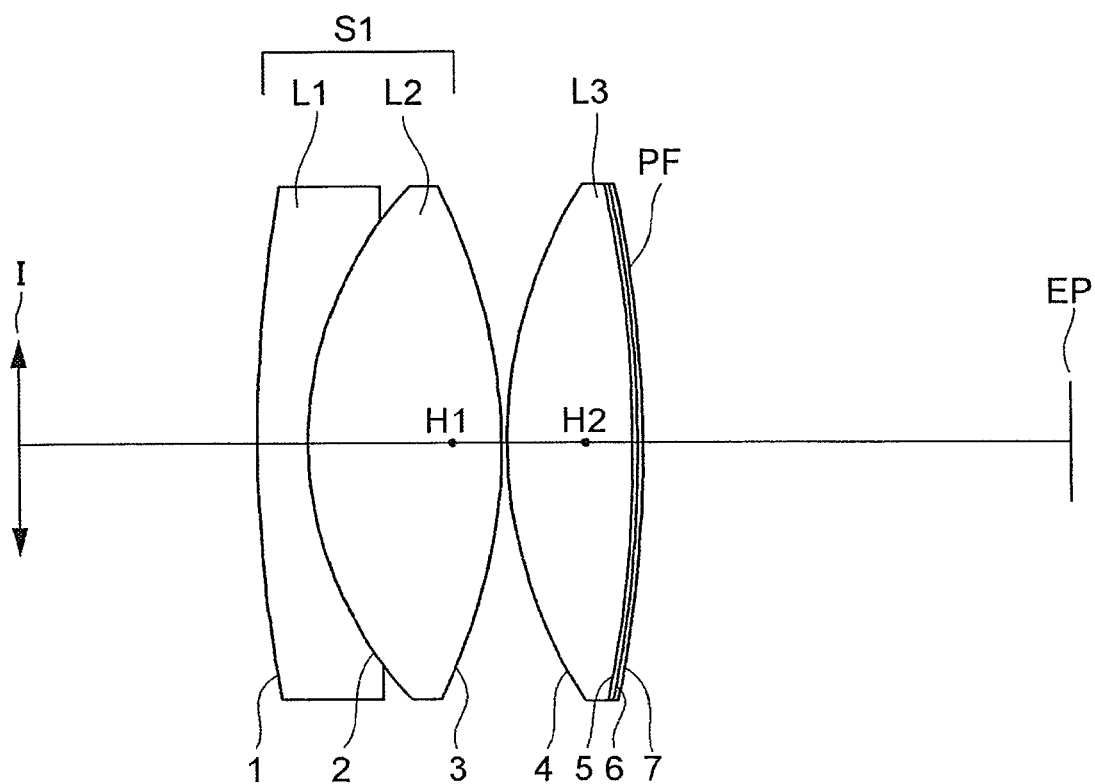
FIG. 4 shows the lens configuration of the eyepiece system in a second example (Example K-2)
Figure 5:
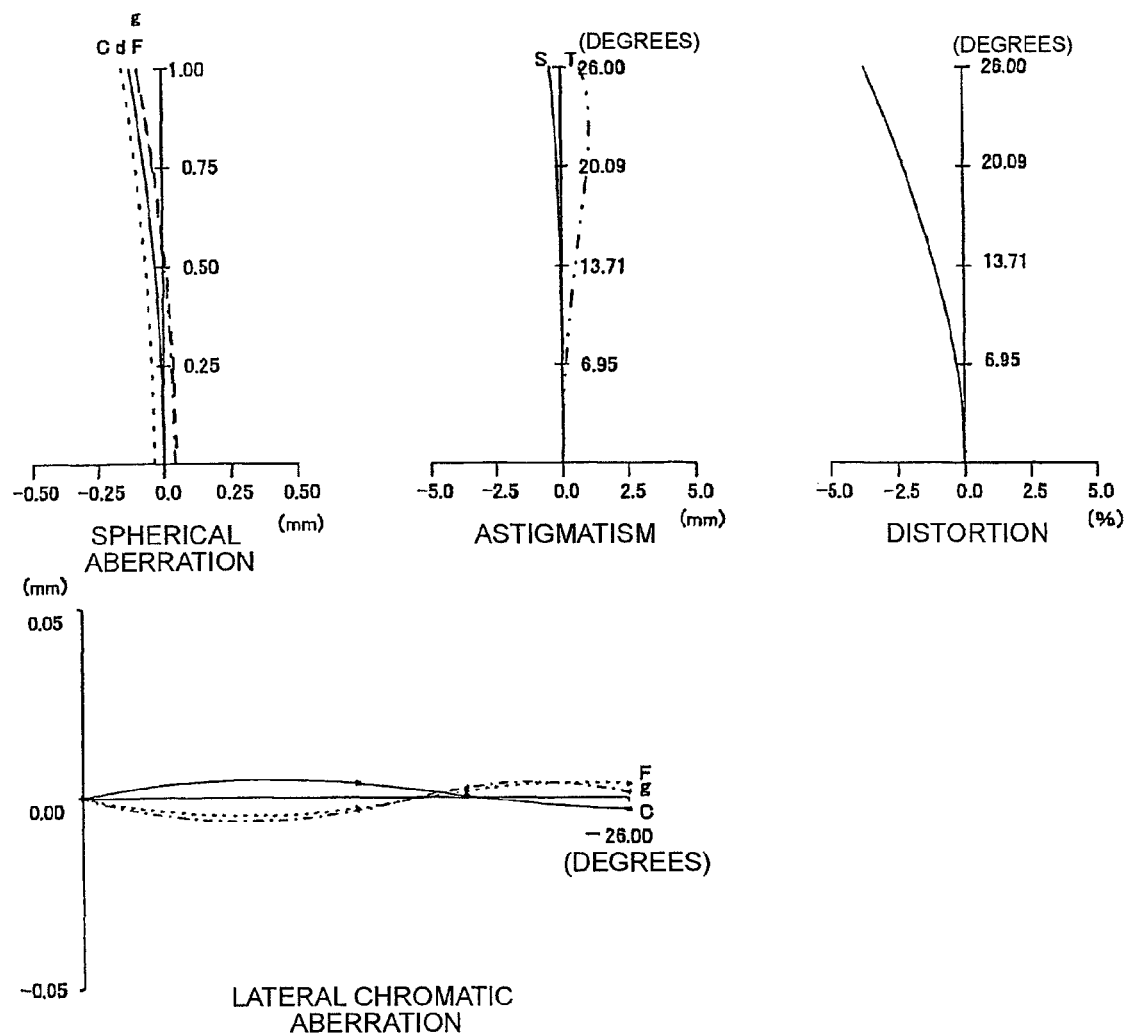
FIG. 5 shows graphs of various aberrations for the eyepiece system in the second example (Example K-2)

Two examples are described of a first group of eyepiece systems (first group), and the lens configurations of each of these examples are shown in FIGS. 2 and 4. Graphs showing various aberrations are shown in FIGS. 3 and 5, the details of which are described in the examples hereinafter.

The first group of eyepiece systems (first group) is composed of a lens group in which a lens having a negative refractive power and a lens having a positive refractive power are joined, the lens group as a whole having a positive refractive power (this lens group also referred to hereinafter as a cemented lens group 1 having a positive refractive power); a diffraction optical element; and a lens group composed of a lens having a positive refractive power. The eyepiece systems have a simple lens configuration. The cemented lens group 1 having a positive refractive power and the lens group having a positive refractive power are arranged in order from the image surface (image formation position) to the eye point (viewing eye side). The examples of the first group of eyepiece systems are also referred to below as Examples K-1 and K-2.

The first group of eyepiece systems has a small number of lenses and is configured with attention to compactness and other characteristics, the angle of view thereof being 26 (degrees). The angle of view may be more accurately referred to as a (half) angle of view, but is referred to below as the angle of view in accordance with convention, unless otherwise noted. Table 1 shows the approximation coefficient ra, the focal length of the diffraction optical element at the d-line (587.562 nm), and the minimum grating pitch of the diffraction optical element.

TABLE 1

|  | Approximation Coefficient (ra) (%) | Focal length of the diffraction optical element at the d-line (mm) | Minimum grating pitch of the diffraction optical element (μm) |
| --- | --- | --- | --- |
| Example K-1 | 41.8 | 500 | 80 |
| Example K-2 | 45.3 | 460 | 56 |

The relationship between the position of the first diffractive optical surface and the principal points in each example is not shown in the drawings described hereinafter, but the first diffractive optical surface in Example K-1 is positioned between the principal points, and in Example K-2, the first diffractive optical surface is positioned outside the principal points and to the rear (toward the eye point) of the rear principal point. It is apparent from Table 1 that the condition of an approximation coefficient ra of 0.5 or less is adequately satisfied by the first group of eyepiece systems. In the present examples, the minimum grating pitch of the diffraction optical element exceeds the lower limit of 20 μm for manufacturing, and includes an adequate margin.

In these examples, furthermore, a trend occurs in which the focal length of the diffraction optical element decreases as the approximation coefficient increases in size; as a result, the minimum grating pitch also decreases. Detailed aberration data are shown in FIGS. 3 and 5, but the various aberrations, particularly lateral chromatic aberration, are satisfactorily corrected in the entire range of wavelengths used in both examples, and exceptional imaging characteristics are obtained.

(Second Group of Eyepiece Systems (Second Group))

Figure 6:
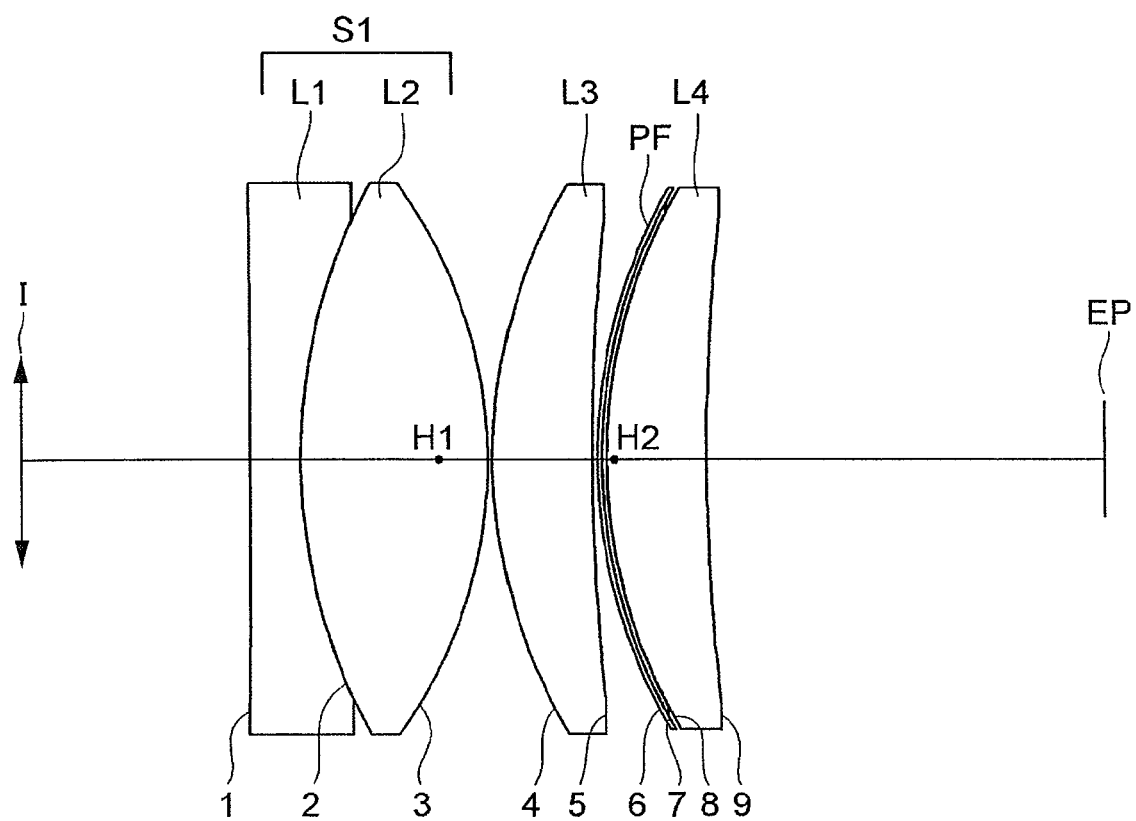
FIG. 6 shows the lens configuration of the eyepiece system in a third example (Example K2-1)
Figure 7:
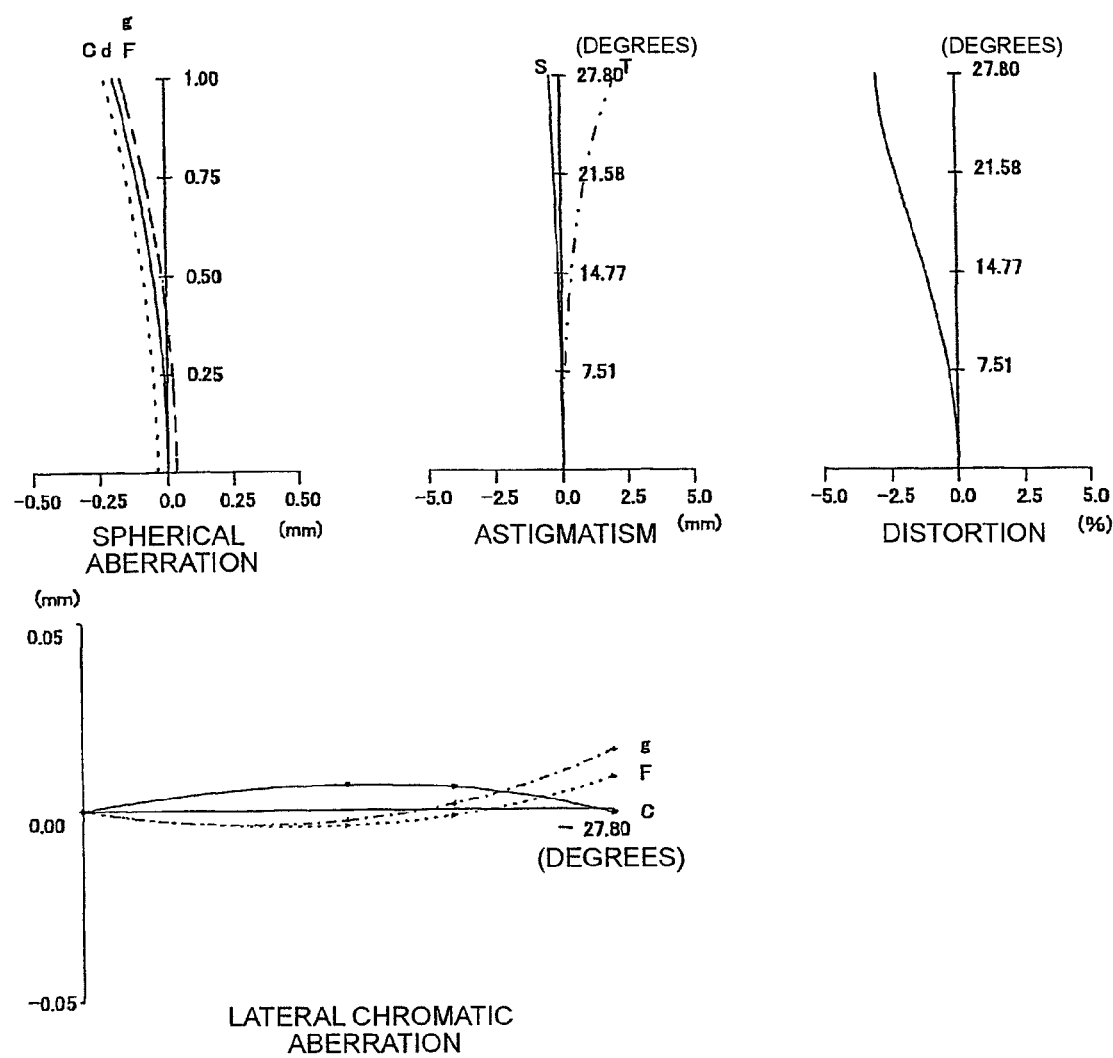
FIG. 7 shows graphs of various aberrations for the eyepiece system in the third example (Example K2-1)
Figure 8:
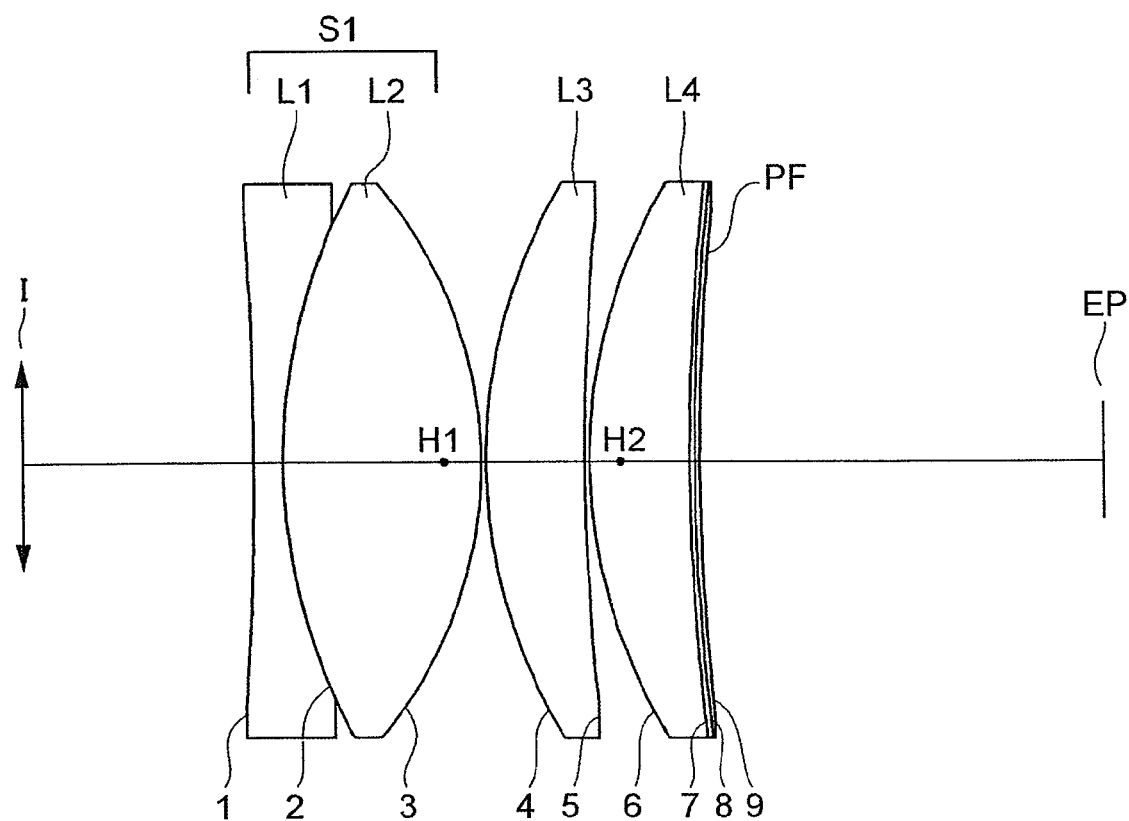
FIG. 8 shows the lens configuration of the eyepiece system in a fourth example (Example K2-2)
Figure 9:
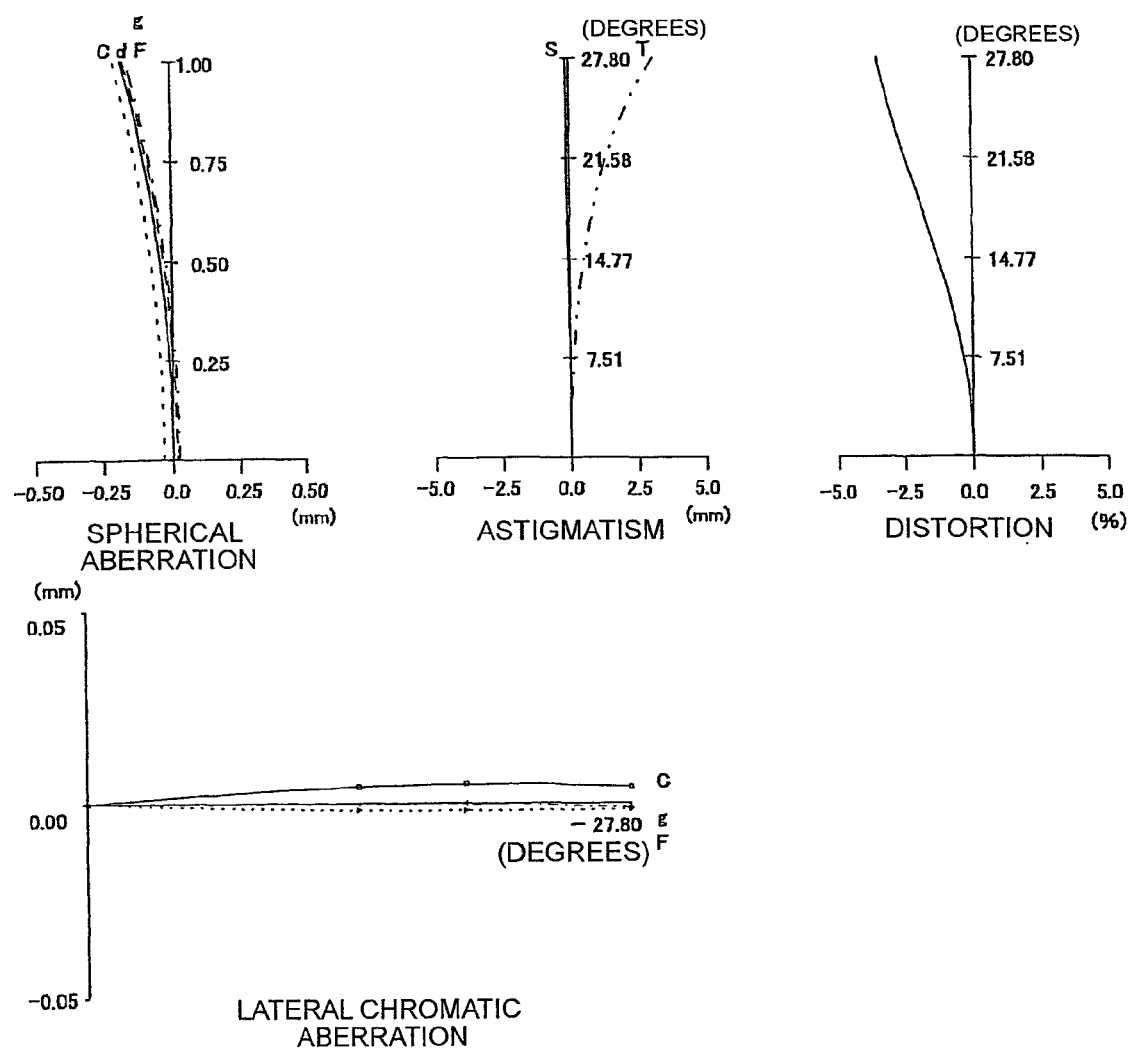
FIG. 9 shows graphs of various aberrations for the eyepiece system in the fourth example (Example K2-2)

Two examples are described of a second group of eyepiece systems (second group), and the lens configurations of each of these examples are shown in FIGS. 6 and 8. Graphs showing various aberrations are shown in FIGS. 7 and 9, the details of which are described in the examples hereinafter.

The second group of eyepiece systems (second group) is composed of a lens group in which a lens having a negative refractive power and a lens having a positive refractive power are joined, the lens group as a whole having a positive refractive power; a diffraction optical element; a lens group having a positive refractive power; and a lens group having a positive refractive power. In other words, the second group of eyepiece systems is formed by adding a lens group having a positive refractive power to configuration of the first group of eyepiece systems. The examples of the second group of eyepiece systems are also referred to below as Examples K2-1 and K2-2.

The angle of view of the second group of eyepiece systems is, as described hereinafter in the examples, 27.8 (degrees), which increases ease of use with regard to the angle of view. Table 2 shows the approximation coefficient ra, the focal length of the diffraction optical element at the d-line (587.562 nm), and the minimum grating pitch of the diffraction optical element.

TABLE 2

|  | Approximation Coefficient (ra) (%) | Focal length of the diffraction optical element at the d-line (mm) | Minimum grating pitch of the diffraction optical element (μm) |
| --- | --- | --- | --- |
| Example K2-1 | 5.7 | 435 | 56 |
| Example K2-2 | 42.3 | 439 | 64 |

The relationship between the position of the first diffractive optical surface and the principal points in each example is not shown in the drawings described hereinafter, but the first diffractive optical surface is positioned between the principal points in both Example K2-1 and Example K2-2. It is apparent from Table 2 that the condition of an approximation coefficient ra of 0.5 or less is adequately satisfied by the second group of eyepiece systems. In the present examples, the minimum grating pitch of the diffraction optical element exceeds the lower limit of 20 μm for manufacturing, and includes an adequate margin.

Detailed aberration data are shown in FIGS. 7 and 9, but various aberrations, particularly lateral chromatic aberration, are satisfactorily corrected in the entire range of wavelengths used in both examples, and exceptional imaging characteristics are obtained.

(Third Group of Eyepiece Systems (Third Group))

Figure 10:
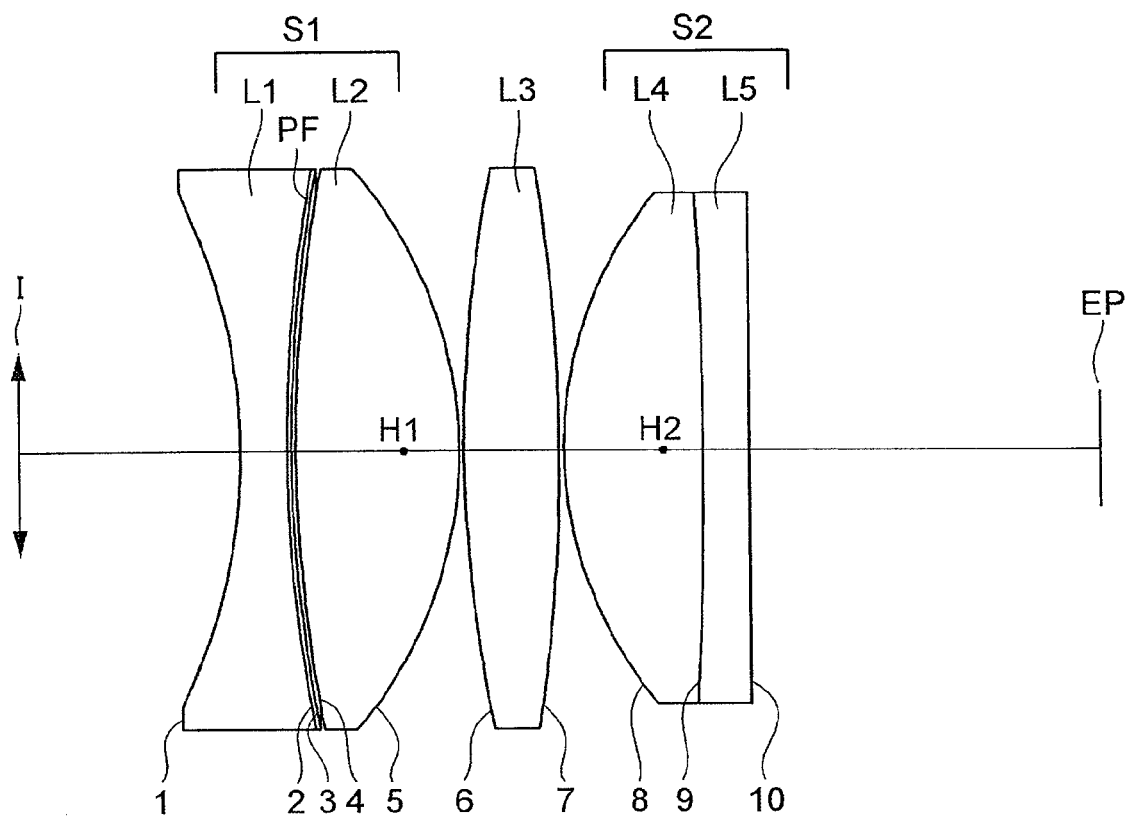
FIG. 10 shows the lens configuration of the eyepiece system in a fifth example (Example E-1)
Figure 11:
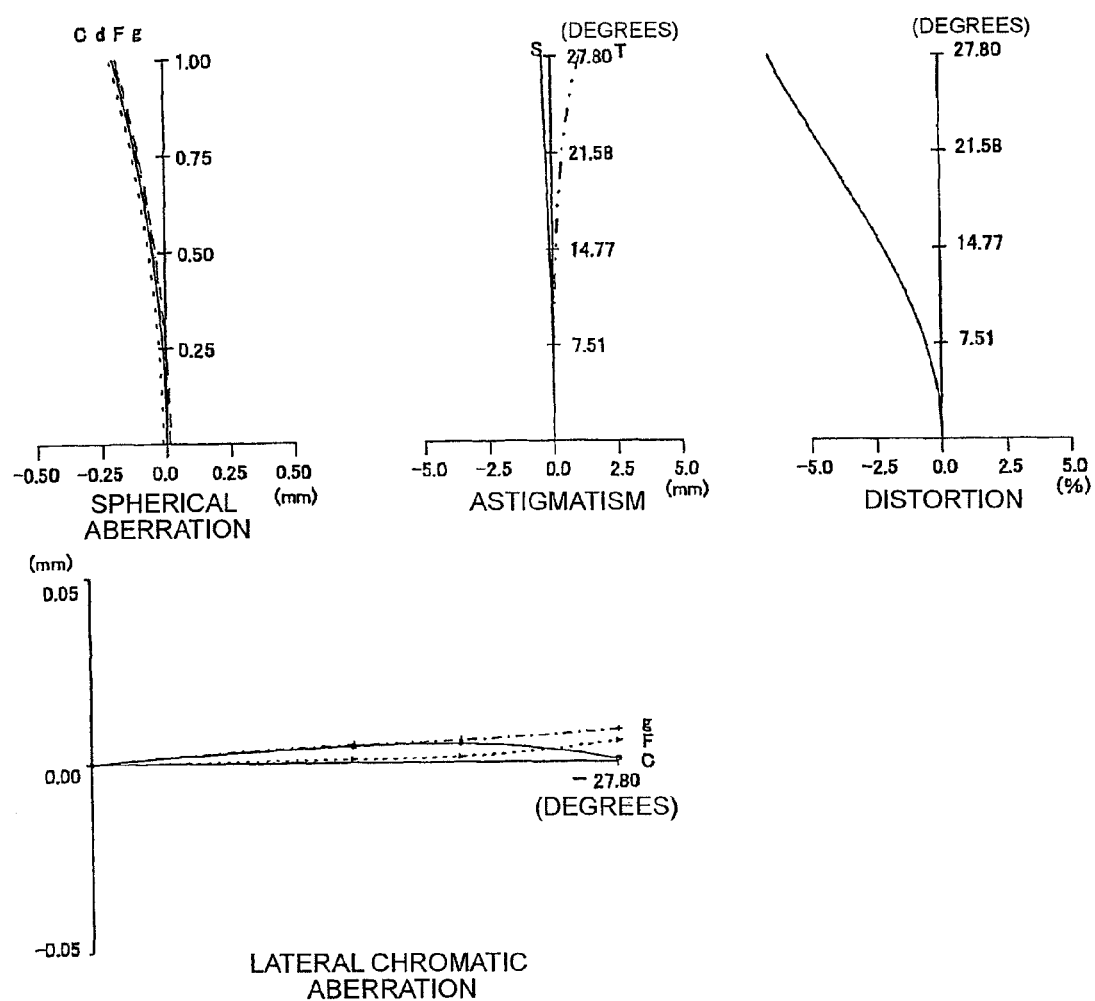
FIG. 11 shows graphs of various aberrations for the eyepiece system in the fifth example (Example E-1)
Figure 12:
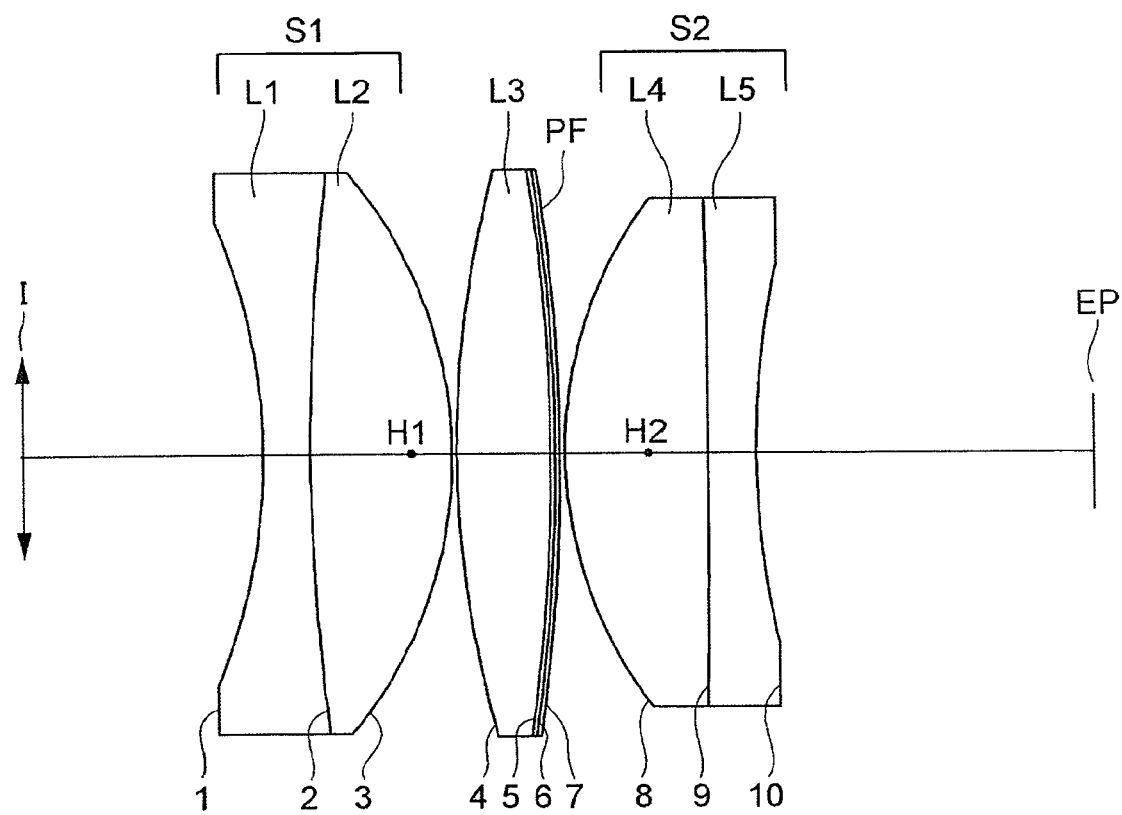
FIG. 12 shows the lens configuration of the eyepiece system in a sixth example (Example E-2)
Figure 13:
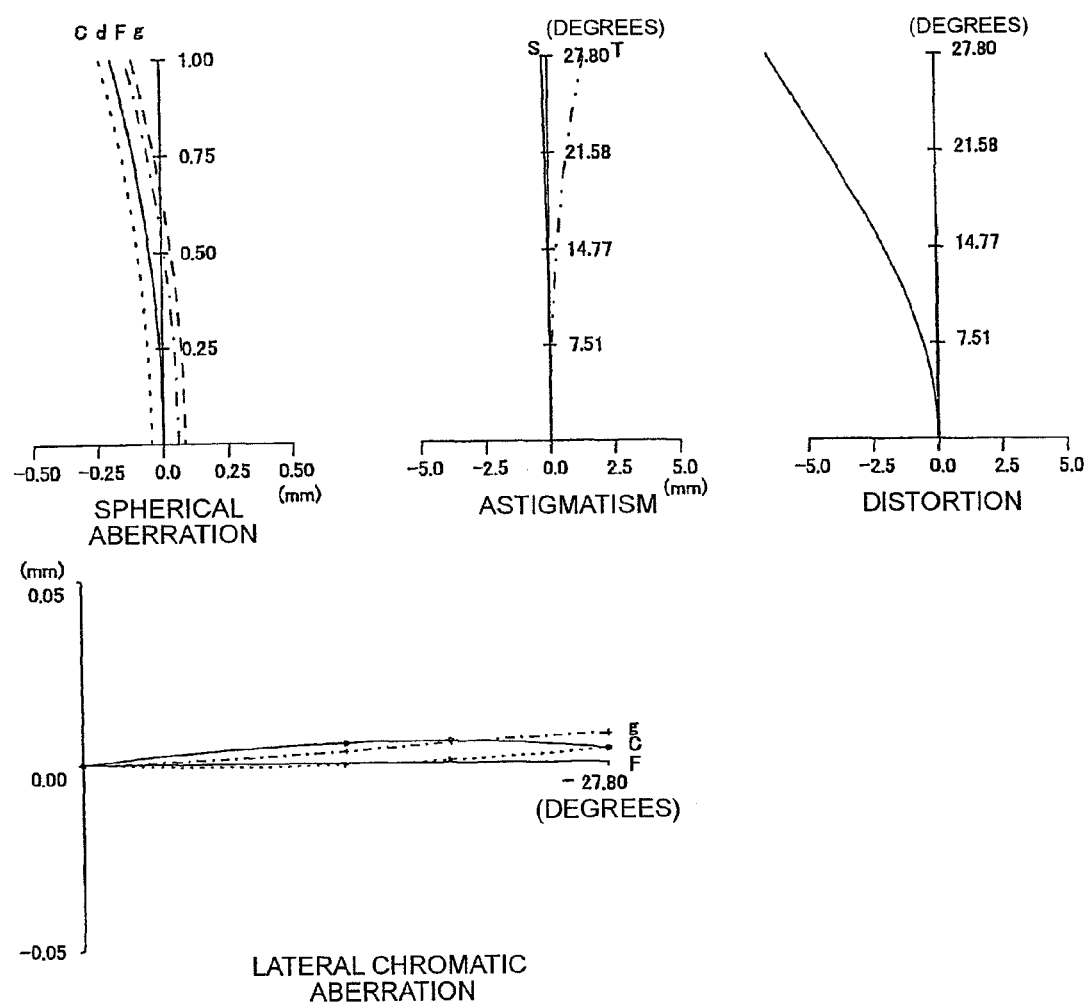
FIG. 13 shows graphs of various aberrations for the eyepiece system in the sixth example (Example E-2)
Figure 14:
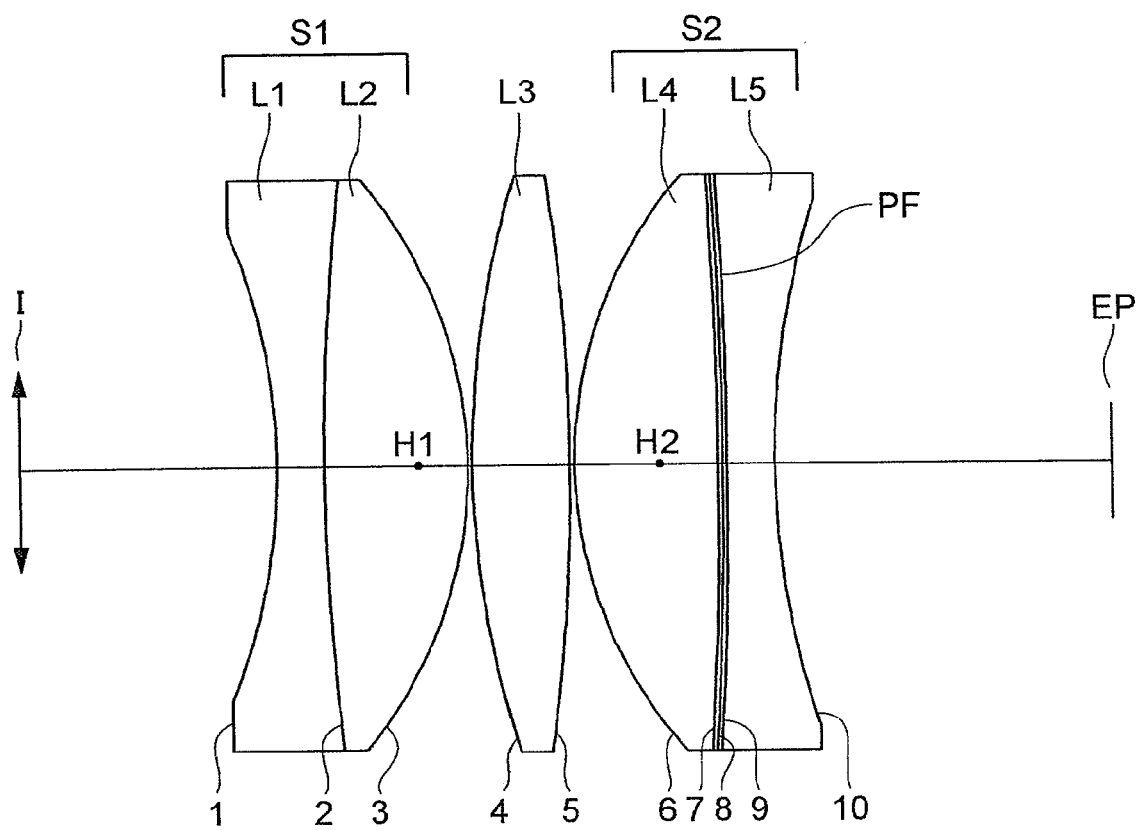
FIG. 14 shows the lens configuration of the eyepiece system in a seventh example (Example E-3)
Figure 15:
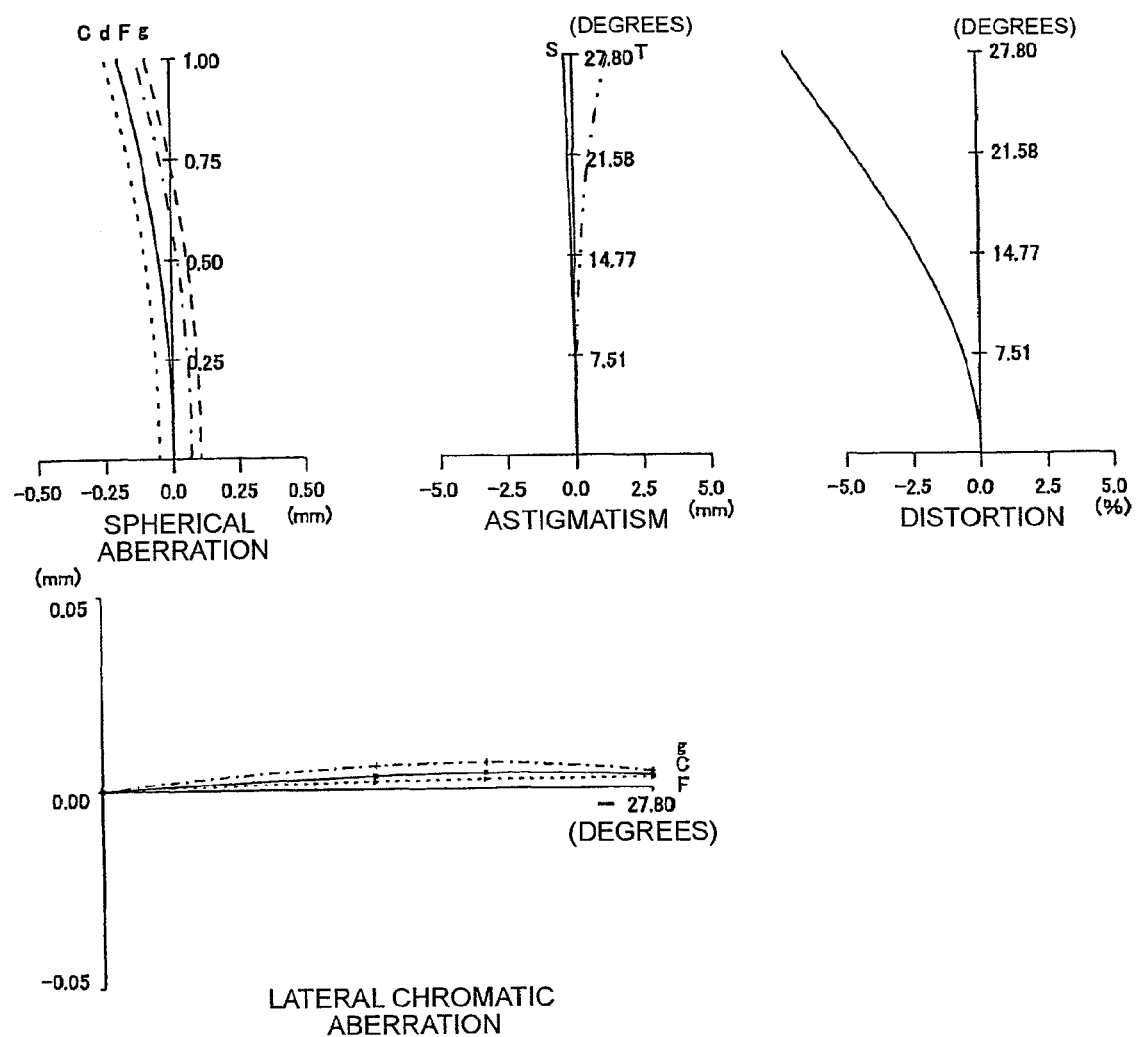
FIG. 15 shows graphs of various aberrations for the eyepiece system in the seventh example (Example E-3)

Three examples are described of a third group of eyepiece systems (third group), and the lens configurations of each of these examples are shown in FIGS. 10, 12, and 14. Graphs showing various aberrations are shown in FIGS. 11, 13, and 15, the details of which are described in the examples hereinafter.

The third group of eyepiece systems (third group) is composed of a lens group in which a lens having a negative refractive power and a lens having a positive refractive power are joined, the lens group as a whole having a positive refractive power; a diffraction optical element; a lens having a positive refractive power; and a lens in which a lens having a positive refractive power and a lens having a negative refractive power are joined, the lens as a whole having a positive refractive power (the lens also abbreviated as a cemented lens 2 having a positive refractive power). The examples of the third group of eyepiece systems are also referred to below as Examples E-1, E-2, and E-3.

The third group of eyepiece systems is formed by adding a cemented lens 2 having a positive refractive power to the first group of eyepiece systems, and the arrangement of lenses from the image surface to the eye point side is such that the cemented lens 2 having a positive refractive power is added to the rear (eye point side) of the lens arrangement of the first group of eyepiece systems. The angle of view of the third group of eyepiece systems is 27.8 (degrees), which makes the eyepiece systems easier to use with regard to the angle of view.

Table 3 shows the approximation coefficient ra, the focal length of the diffraction optical element at the d-line (587.562 nm), and the minimum grating pitch of the diffraction optical element.

TABLE 3

| | Approximation Coefficient (ra) (%) | Focal length of the diffraction optical element at the d-line (mm) | Minimum grating pitch of the diffraction optical element (μm) |
|---|---|---|---|
| Example E-1 | 45.8 | 292 | 32 |
| Example E-2 | 38.0 | 480 | 42 |
| Example E-3 | 26.3 | 417 | 50 |

The relationship between the position of the first diffractive optical surface and the principal points in each example is not shown in the drawings described hereinafter, but the first diffractive optical surface is positioned outside both principal points and in front (toward the image surface) of the front principal point in Example E-1, between the principal points in Example E-2, and outside both principal points and behind (toward the eye point) the rear principal point in Example E-3. It is apparent from Table 3 that the condition of an approximation coefficient ra of 0.5 or less is adequately satisfied by the third group of eyepiece systems. In the present examples, the minimum grating pitch of the diffraction optical element exceeds the lower limit of 20 μm for manufacturing, and includes an adequate margin.

As the approximation coefficient decreases in size, the minimum grating pitch increases in the present examples. The approximation coefficient may be approximately 38% or less in order to provide a greater margin in the manufacture of the diffraction optical element. Detailed aberration data are shown in FIGS. 11, 13, and 15, but various aberrations, particularly lateral chromatic aberration, are satisfactorily corrected in the entire range of wavelengths used in these examples, and exceptional imaging characteristics are obtained.

In Examples E-2 and E-3 in Table 3, the relationship between the focal length of the diffraction optical element at the d-line and the minimum grating pitch of the diffraction optical element is opposite to that of the previous examples. This is because although the focal length at the d-line is a main factor affecting the minimum grating pitch, other factors include C4 and lower coefficients of the diffraction optical element, and the height of incidence on the diffraction optical element. Consequently, the data described above are considered to result from the effects of other factors. However, the focal length at the d-line remains the most important of the primary factors affecting the minimum grating pitch.

(Fourth Group of Eyepiece Systems (Fourth Group))

Figure 16:
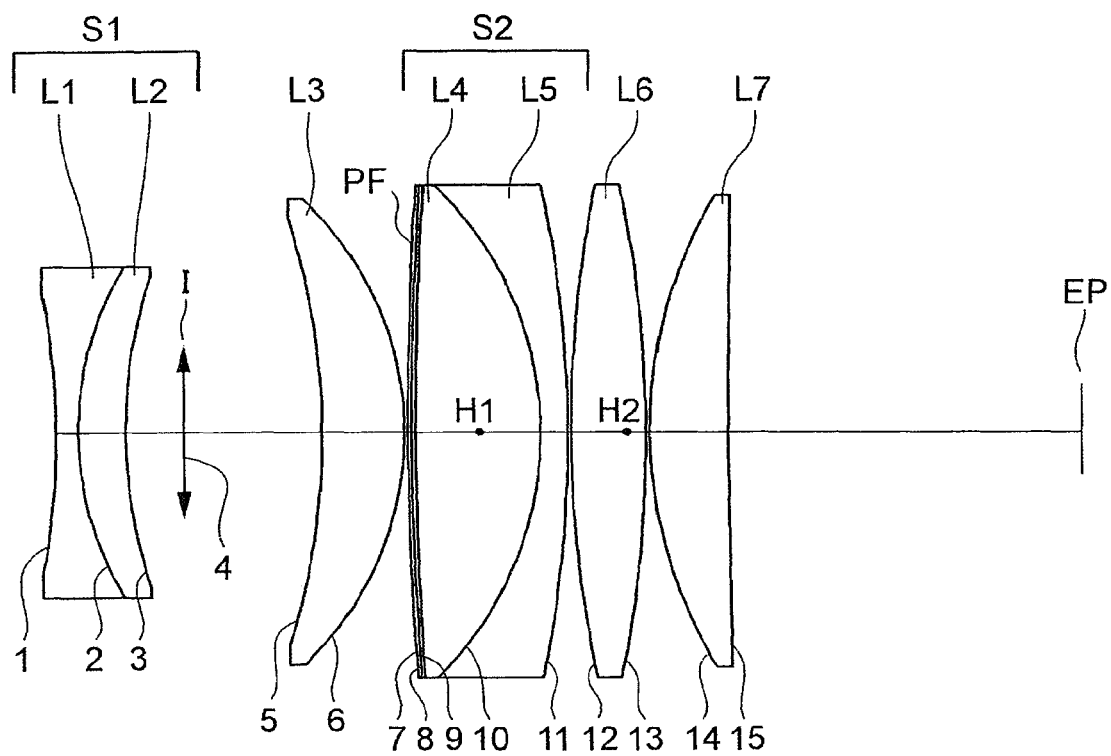
FIG. 16 shows the lens configuration of the eyepiece system in an eighth example (Example N-1)
Figure 17:
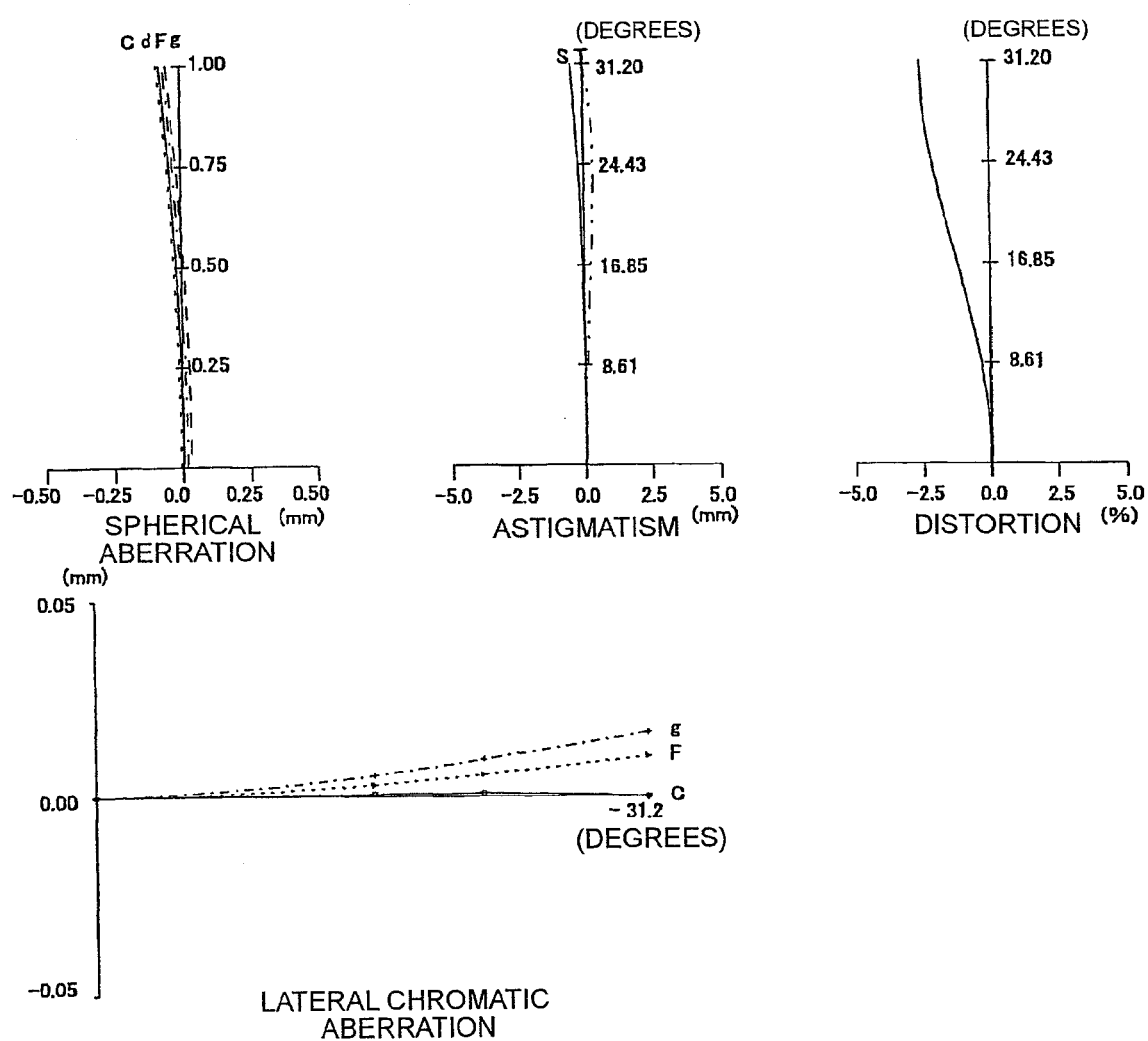
FIG. 17 shows graphs of various aberrations for the eyepiece system in the eighth example (Example N-1)
Figure 18:
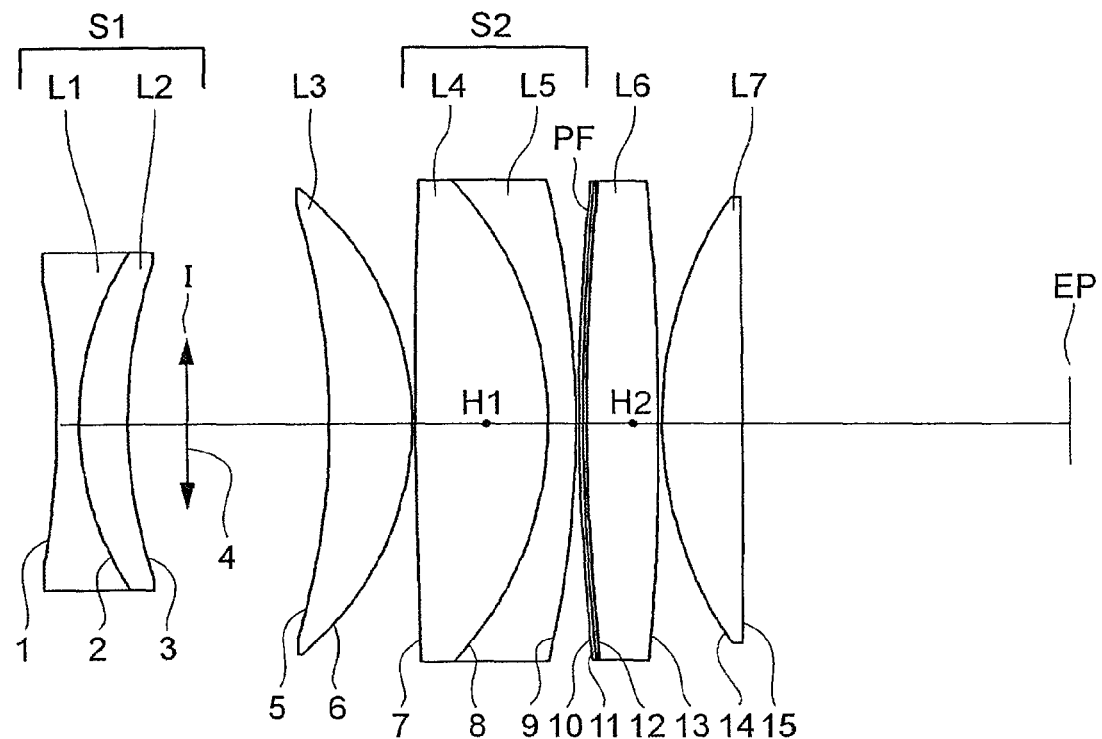
FIG. 18 shows the lens configuration of the eyepiece system in a ninth example (Example N-2)
Figure 19:
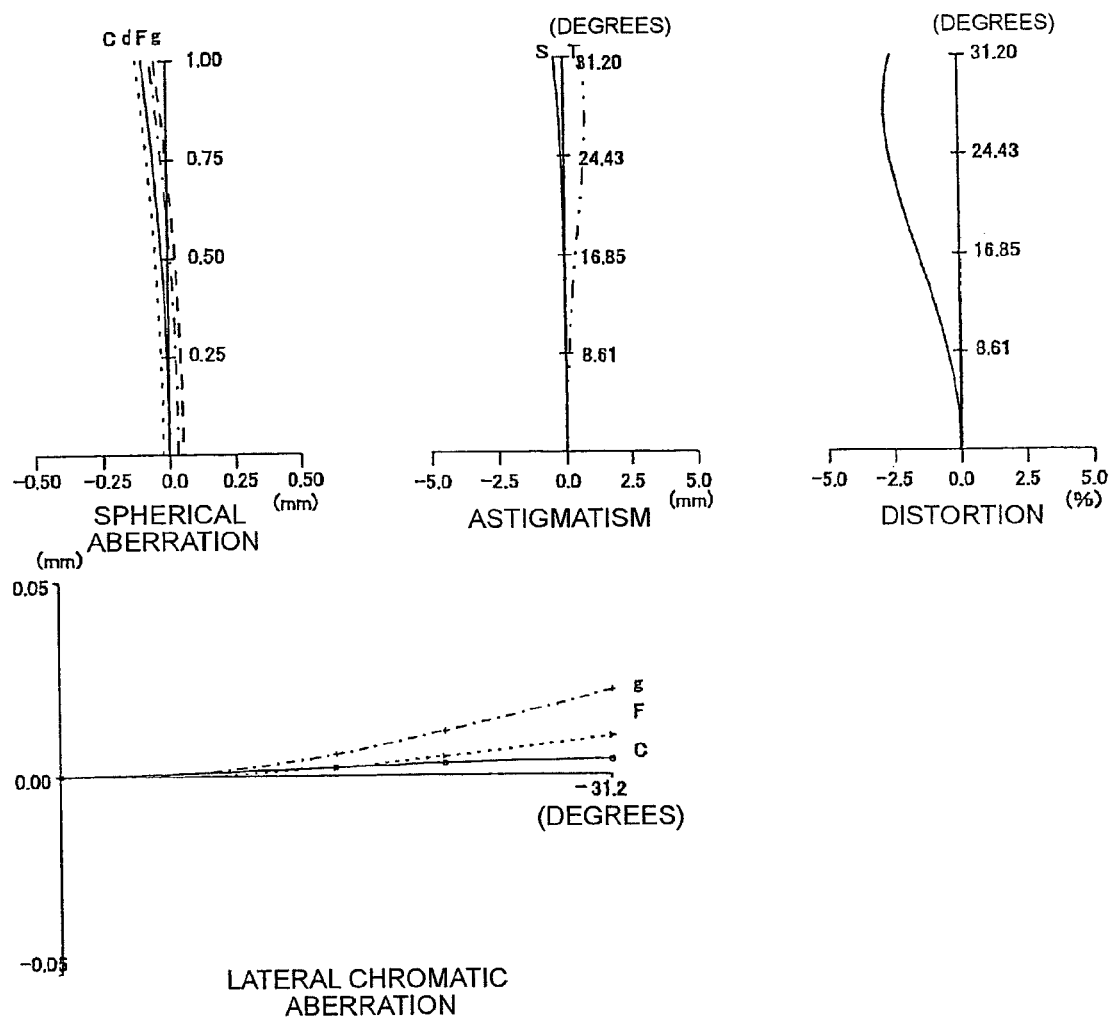
FIG. 19 shows graphs of various aberrations for the eyepiece system in the ninth example (Example N-2)
Figure 20:
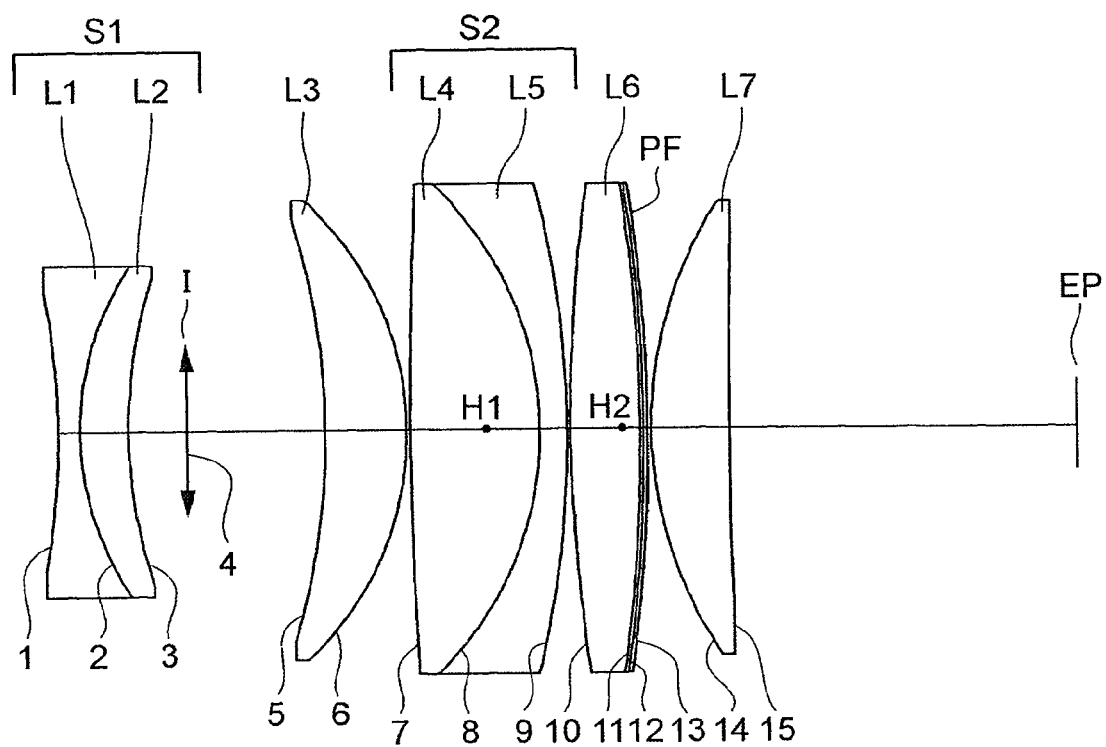
FIG. 20 shows the lens configuration of the eyepiece system in a tenth example (Example N-3)
Figure 21:
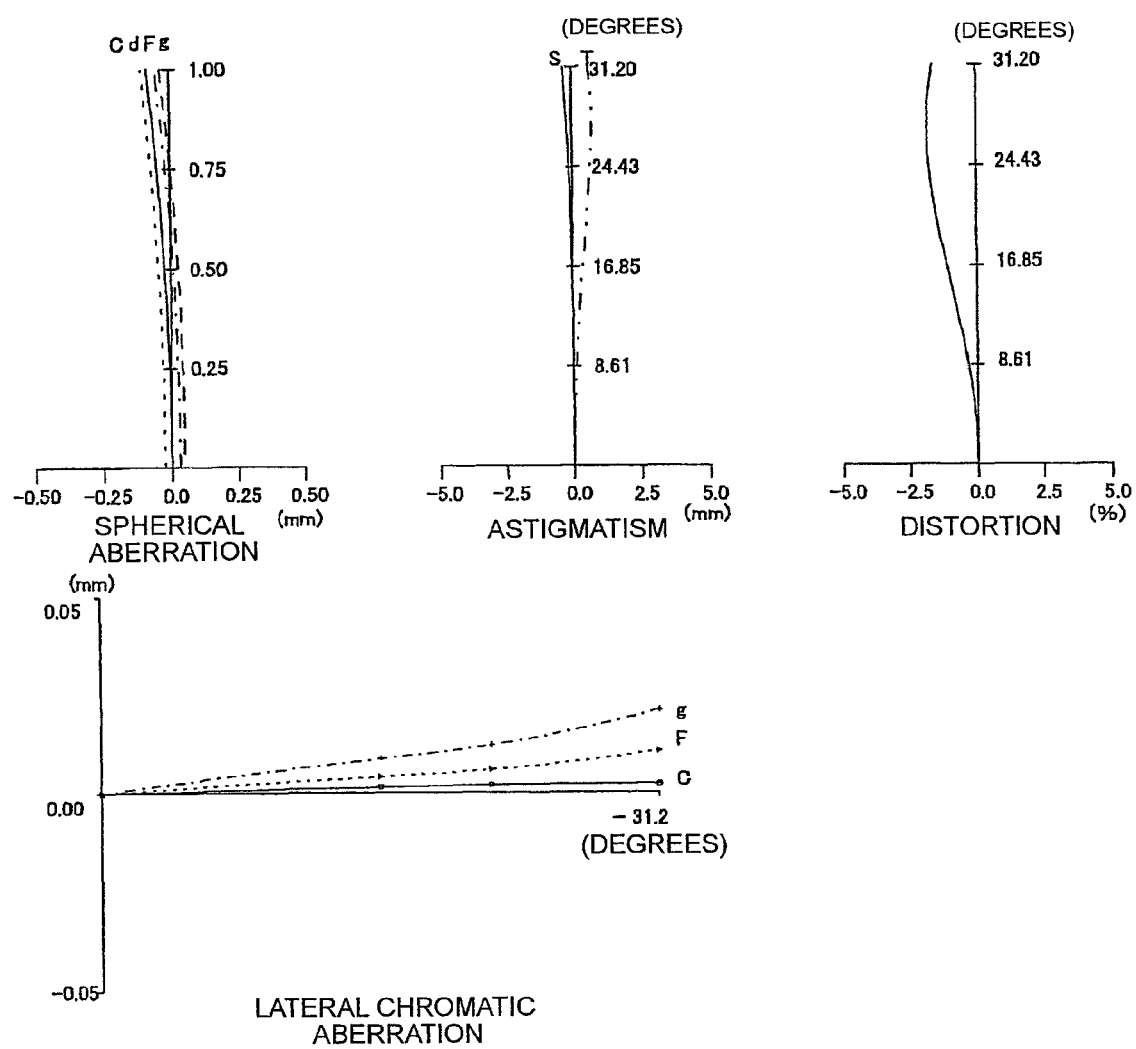
FIG. 21 shows graphs of various aberrations for the eyepiece system in the tenth example (Example N-3)

Three examples are described of a fourth group of eyepiece systems (fourth group), and the lens configurations of each of these examples are shown in FIGS. 16, 18, and 20. Graphs showing various aberrations are shown in FIGS. 17, 19, and 21, the details of which are described in the examples hereinafter.

The fourth group of eyepiece systems (fourth group) is composed of, in order from the object to the eye point, a lens group as a first lens group in which a lens having a negative refractive power and a lens having a positive refractive power are joined, the lens group as a whole having a negative refractive power; a lens group composed of a lens having a positive refractive power as a second lens group; a lens group as a third lens group in which a lens having a negative refractive power and a lens having a positive refractive power are joined, the lens group as a whole having a positive refractive power; a lens group having a positive refractive power as a fourth lens group; and a fifth lens group composed of a lens having a positive refractive power. The image surface is positioned between the first lens group and the second lens group. In other words, the fourth group of eyepiece systems differs significantly from the first through third groups of eyepiece systems in that a lens group is provided in front of the image surface as well. The examples of the fourth group of eyepiece systems are also referred to below as Examples N-1, N-2, and N-3.

The angle of view of the fourth group of eyepiece systems is 31.2 (degrees), which makes the eyepiece systems even easier to use with regard to the angle of view.

Table 4 shows the approximation coefficient ra, the focal length of the diffraction optical element at the d-line (587.562 nm), and the minimum grating pitch of the diffraction optical element of the fourth group of eyepiece systems.

TABLE 4

| | Approximation Coefficient (ra) (%) | Focal length of the diffraction optical element at the d-line (mm) | Minimum grating pitch of the diffraction optical element (μm) |
|---|---|---|---|
| Example N-1 | 46.2 | 526 | 27 |
| Example N-2 | 35.1 | 542 | 31 |
| Example N-3 | 12.8 | 650 | 37 |

The first diffractive optical surface is positioned outside both principal points and in front (toward the image surface) of the front principal point in Example N-1, between the principal points in Example N-2, and outside both principal points and behind (toward the eye point) the rear principal point in Example N-3. It is apparent from Table 4 that the condition of an approximation coefficient ra of 0.5 or less is adequately satisfied by the fourth group of eyepiece systems. In the present examples, the minimum grating pitch of the diffraction optical element exceeds the lower limit of 20 μm for manufacturing, and includes an adequate margin.

As the approximation coefficient decreases in size, the minimum grating pitch increases in the present examples. The approximation coefficient may be approximately 35% or less, more preferably 13% or less, in order to provide a greater margin in the manufacture of the diffraction optical element. Detailed aberration data are omitted, but investigation by the inventors has shown that when the approximation coefficient exceeds 0.5, the minimum grating pitch becomes even finer, and the diffraction optical element can be difficult to manufacture.

Detailed aberration data for the fourth group of eyepiece systems are shown in FIGS. 17, 19, and 21, but various aberrations, particularly lateral chromatic aberration, are satisfactorily corrected in the entire range of wavelengths used in these examples, and exceptional imaging characteristics are obtained.

DESCRIPTION OF EXAMPLES

Examples of the eyepiece system will be described in detail using tables for data and drawings for the lens configuration and other aspects. The method for reading the tables and drawings, and the meaning of the data will first be described. Since as many as ten examples are described, items and data common to all the examples will first be described before the examples are described. For example, the refractive index data of the resins used is summarized first.

(Lens Specification Tables, Meaning of Data, Etc.)

Data are shown in Tables 5, 6, and so on hereinafter; and each of the reference symbols in the tables is described below. Although the descriptive symbols and numbers below are shown in full-width characters, as a rule the data are shown as half-width letters and numbers. There is accordingly no difference in meaning between full-width and half-width characters in the present specification.

Under "(Overall specifications)," ER is the exit pupil diameter (mm), B is the angle of the emergent ray from the lens with respect to the optical axis when light is incident on the lens in the direction from the object to the eye point (EP), and f is the focal length (mm) of the entire system at the d-line (587.562 nm). The value of B in exact terms is equal to the value of the (half) angle of view mentioned in the description of the first group in the summary given above, but is also referred to as the angle of view in the summary descriptions of the other groups, according to convention.

Under "(Lens data)," the surface number is the order of optical surfaces counted from the object side, r is the radius of curvature (mm) of the optical surface, n(d) is the refractive index with respect to the d-line, and νd is the Abbe number with respect to the d-line. In the lens data, "(Diffraction surface)" refers to the surface of the diffraction optical element.

Under "(Diffraction surface data)," the phase function Φ(h) of the diffraction optical element is expressed by the equation (12) below, where h is the height from the optical axis, λ is the wavelength, and C2, C4, C6, C8, and C10 are phase coefficients.

$$\Phi(h)=2\pi/\lambda(C2h^2+C4h^4+C6h^6+C8h^8+C10h^{10}) \quad (12)$$

fd is the focal length (mm) of the diffraction optical element at the d-line (587.562 nm).

Under "(Condition values)," DH1H2 is the absolute value (mm) of the distance on the optical axis between a front principal point and a rear principal point of the optical system positioned between the image surface I and the eye point EP; DH1 is the absolute value (mm) of the distance on the optical axis between a front principal point and the first diffractive optical surface (surface of the diffraction optical element); DH2 is the absolute value (mm) of the distance on the optical axis between a rear principal point and the first diffractive optical surface (surface of the diffraction optical element); and ra is the value (percentage) obtained by dividing the smaller of DH1 and DH2 by DH1H2 and multiplying the result by 100. When DH1 and DH2 are the same, ra is the value (percentage) obtained by dividing DH1 by DH1H2 and multiplying the result by 100. In the present specification, ra is also referred to as the approximation coefficient.

The focal length f, radius of curvature r, distance to the next surface d, minimum grating pitch, and other lengths described in the present examples are generally expressed in millimeter units. However, since the same optical performance is obtained whether in proportional magnification or proportional reduction in the optical system, the units are not limited to millimeters.

Items, data, and descriptions that are common to all the examples are described below. The first common item is that the diffraction optical element PF satisfactorily corrects lateral chromatic aberration, and is a bonded multi-layer diffraction optical element that enables high diffraction efficiency to be obtained in a wide wavelength range PF. In the diffraction optical element PF, diffractive element pieces PF1 and PF2 composed of two different UV-curable resins are bonded together as described using FIG. 1A and other views, and the joint surface is a diffraction optical element surface C in which diffraction grating grooves are formed. In order to simplify the drawings, the reference symbols PF1, PF2, and the reference symbol C for the diffraction optical element surface are omitted from FIG. 2 and other drawings showing the lens configuration, and only the diffraction optical element PF is noted.

The second common item is the refractive index of the resin used. Specifically, resins having the refractive indices shown below are used. The refractive index of the resin is the refractive index of the resin in the cured state.

| (Refractive index of resin) | | | | |
|---|---|---|---|---|
| | nC | nd | nF | ng |
| Low refractive index | 1.523300 | 1.527600 | 1.538500 | 1.547700 |
| High refractive index | 1.553700 | 1.556900 | 1.564800 | 1.571100 |

For each of the resins, nC represents the refractive index with respect to the C-line (wavelength λ=656.273 nm), nd represents the refractive index with respect to the d-line (wavelength λ=587.562 nm), nF represents the refractive index with respect to the F-line (wavelength λ=486.133 nm), and ng represents the refractive index with respect to the g-line (wavelength λ=435.835 nm).

The refractive index values for the resins used all satisfy the conditional expressions shown below for the resins used.

$$nd1 \leq 1.54 \quad (6)$$

$$(nF1-nC1) \geq 0.0145 \quad (7)$$

$$nd2 \geq 1.55 \quad (8)$$

$$(nF2-nC2) \leq 0.013 \quad (9)$$

(Common Items Relating to the Graphs Showing Various Aberrations)

FIGS. 3, 5, and so on are diagrams showing the various aberrations in each example. Each of the aberrations is obtained by ray tracing from the eye point EP side. In the spherical graphs showing various aberrations, d represents the aberration at the d-line, and so on for the C-line, F-line, and g-line. The solid lines in the astigmatism diagrams indicate sagittal image surfaces, and the dashed lines indicate meridional image surfaces. In the lateral chromatic graphs showing various aberrations, C represents the aberration at the C-line, and so on for the F-line and g-line.

The maximum value of the entrance pupil radius is normalized to 1 on the vertical axis of the spherical graphs showing various aberrations, and the horizontal axis indicates the value (mm) of the aberration for each of the lines. The vertical axis in the astigmatism and distortion diagrams indicates the aforementioned B value, i.e., the angle (degrees) of the emergent ray from the lens with respect to the optical axis when light is incident on the lens in the direction from the object to the eye point EP. The horizontal axis indicates the aberration, the aberration being expressed in millimeters in the astigmatism diagrams, and the ratio of aberration being expressed as a percentage (%) in the distortion diagrams. In the lateral chromatic graphs showing various aberrations, the horizontal axis indicates the aforementioned B value (degrees), and the vertical axis indicates the aberration value (mm).

First Example

Example K-1 (First Group)

The eyepiece system in Example K-1 belongs to the aforementioned first group, and, as shown in FIG. 2, this eyepiece system is composed of, in order along the optical axis from the image surface I at the left side in the drawing to the eye point EP, a cemented lens S1 composed of a lens L1 having a negative refractive power and a lens L2 having a positive refractive power; and a lens L3 having a positive refractive power. The cemented lens S1 is a cemented lens having an overall positive refractive power. In the present example, a bonded multi-layer diffraction optical element PF is incorporated on the surface of the positive lens L2 facing the eye point EP. The diffraction optical element described in the common items at the start of the examples is used as the diffraction optical element PF. This description is omitted in the descriptions of the examples below. Table 5 shows data relating to the eyepiece system of the present example (Example K-1).

TABLE 5

(Overall specifications)

ER = 4
B = 26
f = 16.6

(Lens data)

| Surface number | r | d | nd | vd |
|---|---|---|---|---|
| Image surface | ∞ | 9.2 | | |
| 1 | 80.3341 | 2.0 | 1.795040 | 28.56 |
| 2 | 15.0000 | 7.6 | 1.497820 | 82.52 |
| 3 | −19.8788 | 0.2 | 1.527600 | 34.71 |
| 4 (Diffraction surface) | −19.8788 | 0.2 | 1.556900 | 50.17 |
| 5 | −19.8788 | 0.2 | | |
| 6 | 17.2968 | 5.0 | 1.589130 | 61.09 |
| 7 | −80.5082 | 17.9 | | |

(Diffraction surface data)
Fourth surface $C2 = -9.9906E-04$        $C4 = 5.4121E-06$
$C6 = 0.0000E+00$         $C8 = 0.0000E+00$
$C10 = 0.0000E+00$

| fd = | 500 |
|---|---|
| Number of diffraction grating grooves | 78 |
| Minimum grating pitch | 0.080 |

(Conditional expression values)

DH1H2 = 5.5
DH1 = 2.3
DH2 = 3.2
ra = 41.8

FIG. 3 shows graphs showing various aberrations for the eyepiece system in Example K-1. It is apparent that various aberrations, particularly lateral chromatic aberration, are satisfactorily corrected; and that the eyepiece system in the present example provides exceptional imaging performance.

Second Example

Example K-2 (First Group)

As shown in FIG. 4, the structure and arrangement of the eyepiece system in Example K-2 are the same as in Example K-1 except for the position of the diffraction optical element. In the present example, a bonded multi-layer diffraction optical element PF is incorporated on the surface of the positive lens L3 facing the eye point EP. Table 6 shows data relating to the eyepiece system of the present example (Example K-2).

TABLE 6

(Overall specifications)

ER = 4
B = 26
f = 16.6

(Lens data)

| Surface number | r | d | nd | vd |
|---|---|---|---|---|
| Image surface | ∞ | 9.3 | | |
| 1 | 56.6996 | 2.0 | 1.795040 | 28.56 |
| 2 | 14.9210 | 7.6 | 1.497820 | 82.52 |
| 3 | −22.5618 | 0.2 | | |
| 4 | 18.8228 | 5.0 | 1.589130 | 61.09 |
| 5 | −50.1115 | 0.2 | 1.527600 | 34.71 |
| 6 (Diffraction surface) | −50.1115 | 0.2 | 1.556900 | 50.17 |
| 7 | −50.1115 | 16.9 | | |

(Diffraction surface data)
Sixth surface $C2 = -1.0877E-03$        $C4 = 1.3675E-05$
$C6 = -6.6697E-08$        $C8 = 0.0000E+00$
$C10 = 0.0000E+00$

| fd = | 460 |
|---|---|
| Number of diffraction grating grooves | 56 |
| Minimum grating pitch | 0.105 |

(Conditional expression values)

DH1H2 = 5.3
DH1 = 7.7
DH2 = 2.4
ra = 45.3

FIG. 5 shows graphs showing various aberrations for the eyepiece system in Example K-2. It is apparent that various aberrations, particularly lateral chromatic aberration, are satisfactorily corrected; and that the eyepiece system in the present example provides exceptional imaging performance.

Third Example

Example K2-1 (Second Group)

The eyepiece system in Example K2-1 belongs to the aforementioned second group, and as shown in FIG. 6, this eyepiece system is composed of, in order along the optical axis from the image surface I at the left side in the drawing to the eye point EP, a cemented lens S1 composed of a lens L1 having a negative refractive power and a lens L2 having a positive refractive power; a lens L3 having a positive refractive power; and a lens L4 having a positive refractive power. The cemented lens S1 is a cemented lens having an overall positive refractive power. In the present example, a bonded multi-layer diffraction optical element PF is incorporated on the surface of the positive lens L4 facing the image surface I. Table 7 shows data relating to the eyepiece system of the present example (Example K2-1).

TABLE 7

(Overall specifications)

ER = 4
B = 27.8
f = 16.6

TABLE 7-continued (Lens data)

| Surface number | r | d | nd | vd |
|---|---|---|---|---|
| Image surface | ∞ | 9.1 | | |
| 1 | −930.2691 | 2.0 | 1.795040 | 28.56 |
| 2 | 23.8000 | 7.5 | 1.497820 | 82.52 |
| 3 | −19.1000 | 0.2 | | |
| 4 | 21.9000 | 4.0 | 1.589130 | 61.09 |
| 5 | 95.5460 | 0.2 | | |
| 6 | 21.9000 | 0.2 | 1.556900 | 50.17 |
| 7 (Diffraction surface) | 21.9000 | 0.2 | 1.527600 | 34.71 |
| 8 | 21.9000 | 4.0 | 1.589130 | 61.09 |
| 9 | 95.5460 | 16.0 | | |

(Diffraction surface data)
Seventh surface

C2 = −1.1500E−03     C4 = 4.1500E−06
C6 = 0.0000E+00      C8 = 0.0000E+00
C10 = 0.0000E+00

| fd = | 435 |
|---|---|
| Number of diffraction grating grooves | 116 |
| Minimum grating pitch | 0.056 |

(Conditional expression values)

DH1H2 = 7.0
DH1 = 6.6
DH2 = 0.4
ra = 5.7

FIG. 7 shows graphs showing various aberrations for the eyepiece system in Example K2-1. It is apparent that various aberrations, particularly lateral chromatic aberration, are satisfactorily corrected; and that the eyepiece system in the present example provides exceptional imaging performance.

Fourth Example

Example K2-2 (Second Group)

As shown in FIG. 8, the structure and arrangement of the eyepiece system in Example K2-2 are the same as in Example K2-1 except for the position of the diffraction optical element. In the present example, a bonded multi-layer diffraction optical element PF is incorporated on the surface of the positive lens L4 facing the eye point EP. Table 8 shows data relating to the eyepiece system of the present example (Example K2-2).

TABLE 8

(Overall specifications)

ER = 4
B = 27.8
f = 16.6

(Lens data)

| Surface number | r | d | nd | vd |
|---|---|---|---|---|
| Image surface | ∞ | 8.9 | | |
| 1 | −145.5100 | 1.2 | 1.795040 | 28.56 |
| 2 | 23.9000 | 8.0 | 1.497820 | 82.52 |
| 3 | −17.5600 | 0.2 | | |
| 4 | 22.0132 | 4.0 | 1.589130 | 61.09 |
| 5 | 100.0530 | 0.2 | | |
| 6 | 22.0132 | 4.0 | 1.589130 | 61.09 |
| 7 | 100.0530 | 0.2 | 1.527600 | 34.71 |
| 8 (Diffraction surface) | 100.0530 | 0.2 | 1.556900 | 50.17 |
| 9 | 100.0530 | 16.3 | | |

(Diffraction surface data)
Eighth surface

C2 = −1.1390E−03     C4 = 5.2560E−06
C6 = 0.0000E+00      C8 = 0.0000E+00
C10 = 0.0000E+00

| fd = | 439 |
|---|---|
| Number of diffraction grating grooves | 95 |
| Minimum grating pitch | 0.064 |

(Conditional expression values)

DH1H2 = 7.1
DH1 = 10.1
DH2 = 3.0
ra = 42.3

FIG. 9 shows graphs showing various aberrations for the eyepiece system in Example K2-2. It is apparent that various aberrations, particularly lateral chromatic aberration, are satisfactorily corrected; and that the eyepiece system in the present example provides exceptional imaging performance.

Fifth Example

Example E-1 (Third Group)

The eyepiece system in Example E-1 belongs to the aforementioned third group; and, as shown in FIG. 10, this eyepiece system is composed of, in order along the optical axis from the image surface I at the left side in the drawing to the eye point EP, a cemented lens S1 composed of a lens L1 having a negative refractive power and a lens L2 having a positive refractive power; a lens L3 having a positive refractive power; and a cemented lens S2 composed of a lens L4 having a positive refractive power and a lens L5 having a negative refractive power. Each of the cemented lenses S1, S2 is a cemented lens having a positive refractive power overall. In the present example, a bonded multi-layer diffraction optical element PF is incorporated on the surface between the negative lens L1 and the positive lens L2. Table 9 shows data relating to the eyepiece system of the present example (Example E-1).

TABLE 9

(Overall specifications)

ER = 4
B = 27.8
f = 16.6

(Lens data)

| Surface number | r | d | nd | vd |
|---|---|---|---|---|
| Image surface | ∞ | 9.5 | | |
| 1 | −24.9790 | 2.0 | 1.805182 | 25.35 |
| 2 | 62.9401 | 0.2 | 1.556900 | 50.17 |
| 3 (Diffraction surface) | 62.9401 | 0.2 | 1.527600 | 34.71 |
| 4 | 62.9401 | 7.0 | 1.664460 | 35.83 |
| 5 | −18.7578 | 0.2 | | |
| 6 | 60.6934 | 4.0 | 1.620409 | 60.14 |
| 7 | −77.4658 | 0.2 | | |
| 8 | 17.2844 | 6.0 | 1.692111 | 54.55 |
| 9 | −200.0000 | 2.0 | 1.805182 | 25.35 |
| 10 | 39.4682 | 15.0 | | |

TABLE 9-continued (Diffraction surface data)
Third surface

| C2 = −1.7145E−03 | C4 = 4.2943E−06 |
|---|---|
| C6 = 0.0000E+00 | C8 = 0.0000E+00 |
| C10 = 0.0000E+00 | |

| fd = | 292 |
|---|---|
| Number of diffraction grating grooves | 227 |
| Minimum grating pitch | 0.032 |

(Conditional expression values)

DH1H2 = 10.7
DH1 = 4.9
DH2 = 15.6
ra = 45.8

FIG. 11 shows graphs showing various aberrations for the eyepiece system in Example E-1. It is apparent that various aberrations, particularly lateral chromatic aberration, are satisfactorily corrected; and that the eyepiece system in the present example provides exceptional imaging performance.

Sixth Example

Example E-2 (Third Group)

As shown in FIG. 12, the structure and arrangement of the eyepiece system in Example E-2 are the same as in Example E-1 except for the position of the diffraction optical element. In the present example, a bonded multi-layer diffraction optical element PF is incorporated on the surface of the positive lens L3 facing the eye point EP. Table 10 shows data relating to the eyepiece system of the present example (Example E-2).

TABLE 10

(Overall specifications)

ER = 4
B = 27.8
f = 16.6

(Lens data)

| Surface number | r | d | nd | vd |
|---|---|---|---|---|
| Image surface | ∞ | 10.5 | | |
| 1 | −25.4762 | 2.0 | 1.805182 | 25.35 |
| 2 | 95.0960 | 6.0 | 1.664460 | 35.83 |
| 3 | −18.6180 | 0.2 | | |
| 4 | 44.1550 | 4.0 | 1.620409 | 60.14 |
| 5 | −79.7632 | 0.2 | 1.527600 | 34.71 |
| 6 (Diffraction surface) | −79.7632 | 0.2 | 1.556900 | 50.17 |
| 7 | −79.7632 | 0.2 | | |
| 8 | 17.9430 | 6.0 | 1.692111 | 54.55 |
| 9 | −500.0000 | 2.0 | 1.805182 | 25.35 |
| 10 | 35.7340 | 14.3 | | |

(Diffraction surface data)
Sixth surface

| C2 = −1.0400E−03 | C4 = 1.7049E−06 |
|---|---|
| C6 = 0.0000E+00 | C8 = 0.0000E+00 |
| C10 = 0.0000E+00 | |

| fd = | 480 |
|---|---|
| Number of diffraction grating grooves | 170 |
| Minimum grating pitch | 0.042 |

TABLE 10-continued (Conditional expression values)

DH1H2 = 10.0
DH1 = 6.2
DH2 = 3.8
ra = 38.0

FIG. 13 shows graphs showing various aberrations for the eyepiece system in Example E-2. It is apparent that various aberrations, particularly lateral chromatic aberration, are satisfactorily corrected; and that the eyepiece system in the present example provides exceptional imaging performance.

Seventh Example

Example E-3 (Third Group)

As shown in FIG. 14, the structure and arrangement of the eyepiece system in Example E-3 are the same as in Example E-1 except for the position of the diffraction optical element. In the present example, a bonded multi-layer diffraction optical element PF is incorporated on the surface between the positive lens L4 and the negative lens L5. Table 11 shows data relating to the eyepiece system of the present example (Example E-3).

TABLE 11

(Overall specifications)

ER = 4
B = 27.8
f = 16.6

(Lens data)

| Surface number | r | d | nd | vd |
|---|---|---|---|---|
| Image surface | ∞ | 10.6 | | |
| 1 | −25.3919 | 2.0 | 1.805182 | 25.35 |
| 2 | 100.9909 | 6.0 | 1.664460 | 35.83 |
| 3 | −18.7318 | 0.2 | | |
| 4 | 40.4013 | 4.0 | 1.620409 | 60.14 |
| 5 | −83.4900 | 0.2 | | |
| 6 | 18.2493 | 6.0 | 1.692111 | 54.55 |
| 7 | −194.5687 | 0.2 | 1.556900 | 50.17 |
| 8 (Diffraction surface) | −194.5687 | 0.2 | 1.527600 | 34.71 |
| 9 | −194.5687 | 2.0 | 1.805182 | 25.35 |
| 10 | 35.8274 | 14.1 | | |

(Diffraction surface data)
Eighth surface

| C2 = −1.2000E−03 | C4 = 3.6700E−06 |
|---|---|
| C6 = 0.0000E+00 | C8 = 0.0000E+00 |
| C10 = 0.0000E+00 | |

| fd = | 417 |
|---|---|
| Number of diffraction grating grooves | 119 |
| Minimum grating pitch | 0.050 |

(Conditional expression values)

DH1H2 = 9.9
DH1 = 12.5
DH2 = 2.6
ra = 26.3

FIG. 15 shows graphs showing various aberrations for the eyepiece system in Example E-3. It is apparent that various aberrations, particularly lateral chromatic aberration, are satisfactorily corrected; and that the eyepiece system in the present example provides exceptional imaging performance.

Eighth Example

Example N-1 (Fourth Group)

The eyepiece system in Example N-1 belongs to the aforementioned fourth group, and as shown in FIG. 16, this eyepiece system is composed of, in order along the optical axis from the object at the left side in the drawing to the eye point EP, a cemented lens S1 composed of a lens L1 having a negative refractive power and a lens L2 having a positive refractive power; a lens L3 having a positive refractive power; a cemented lens S2 composed of a lens L4 having a positive refractive power and a lens L5 having a negative refractive power; a lens L6 having a positive refractive power; and a lens L7 having a positive refractive power. The cemented lens S1 is a cemented lens having an overall negative refractive power. The cemented lens S2 is a cemented lens having an overall positive refractive power. In the present example, a bonded multi-layer diffraction optical element PF is incorporated on the surface of the lens LA facing the image surface I. Table 12 shows data relating to the eyepiece system of the present example (Example N-1). Surface number 4 in the lens data is the image surface.

TABLE 12

(Overall specifications)

ER = 4
B = 31.2
f = 14.8

(Lens data)

| Surface number | r | d | nd | vd |
| --- | --- | --- | --- | --- |
| 1 | −42.3960 | 1.2 | 1.516800 | 64.10 |
| 2 | 17.6000 | 2.6 | 1.713000 | 53.93 |
| 3 | 27.2560 | 3.1 | | |
| 4 Image surface | ∞ | 7.7 | | |
| 5 | −39.4700 | 4.4 | 1.620409 | 60.14 |
| 6 | −18.0000 | 0.2 | | |
| 7 | 194.3630 | 0.2 | 1.556900 | 50.17 |
| 8 (Diffraction surface) | 194.3630 | 0.2 | 1.527600 | 34.71 |
| 9 | 194.3630 | 6.8 | 1.620409 | 60.14 |
| 10 | −18.9650 | 1.5 | 1.805182 | 25.41 |
| 11 | −66.1130 | 0.2 | | |
| 12 | 66.5780 | 4.1 | 1.620409 | 60.14 |
| 13 | −66.5780 | 0.2 | | |
| 14 | 24.9945 | 4.3 | 1.589130 | 61.09 |
| 15 | 500.0000 | 19.2 | | |

(Diffraction surface data)
Eighth surface $C2 = -9.5000E-04$   $C4 = 2.0000E-07$
$C6 = 0.0000E+00$   $C8 = 0.0000E+00$
$C10 = 0.0000E+00$

| fd = | 526 |
| --- | --- |
| Number of diffraction grating grooves | 237 |
| Minimum grating pitch | 0.027 |

(Conditional expression values)

DH1H2 = 7.8
DH1 = 3.6
DH2 = 11.4
ra = 46.2

FIG. 17 shows graphs showing various aberrations for the eyepiece system in Example N-1. It is apparent that various aberrations, particularly lateral chromatic aberration, are satisfactorily corrected; and that the eyepiece system in the present example provides exceptional imaging performance.

Ninth Example

Example N-2 (Fourth Group)

As shown in FIG. 18, the structure and arrangement of the eyepiece system in Example N-2 are the same as in Example N-1 except for the position of the diffraction optical element. In the present example, a bonded multi-layer diffraction optical element PF is incorporated on the surface of the positive lens L6 facing the image surface I. Table 13 shows data relating to the eyepiece system of the present example (Example N-2). Surface number 4 in the lens data is the image surface.

TABLE 13

(Overall specifications)

ER = 4
B = 31.2
f = 14.8

(Lens data)

| Surface number | r | d | nd | vd |
| --- | --- | --- | --- | --- |
| 1 | −42.3960 | 1.2 | 1.516800 | 64.10 |
| 2 | 16.6258 | 2.6 | 1.713000 | 53.93 |
| 3 | 27.2560 | 3.1 | | |
| 4 Image surface | ∞ | 7.7 | | |
| 5 | −40.0000 | 4.4 | 1.620409 | 60.14 |
| 6 | −16.3110 | 0.2 | | |
| 7 | 432.7290 | 7.0 | 1.620409 | 60.14 |
| 8 | −19.3870 | 1.5 | 1.805182 | 25.41 |
| 9 | −56.2730 | 0.2 | | |
| 10 | 128.7740 | 0.2 | 1.556900 | 50.17 |
| 11 (Diffraction surface) | 128.7740 | 0.2 | 1.527600 | 34.71 |
| 12 | 128.7740 | 3.8 | 1.620409 | 60.14 |
| 13 | −154.8173 | 0.2 | | |
| 14 | 21.2625 | 4.3 | 1.589130 | 61.09 |
| 15 | −1178.1668 | 17.6 | | |

(Diffraction surface data)
Eleventh surface $C2 = -9.2225E-04$   $C4 = 4.6400E-07$
$C6 = 0.0000E+00$   $C8 = 0.0000E+00$
$C10 = 0.0000E+00$

| fd = | 542 |
| --- | --- |
| Number of diffraction grating grooves | 207 |
| Minimum grating pitch | 0.031 |

(Conditional expression values)

DH1H2 = 7.7
DH1 = 5.0
DH2 = 2.7
ra = 35.1

FIG. 19 shows graphs showing various aberrations for the eyepiece system in Example N-2. It is apparent that various aberrations, particularly lateral chromatic aberration, are satisfactorily corrected; and that the eyepiece system in the present example provides exceptional imaging performance.

Tenth Example

Example N-3 (Fourth Group)

As shown in FIG. 20, the structure and arrangement of the eyepiece system in Example N-3 are the same as in Example N-1 except for the position of the diffraction optical element. In the present example, a bonded multi-layer diffraction optical element PF is incorporated on the surface of the positive lens L6 facing the eye point EP. Table 14 shows data relating to the eyepiece system of the present example (Example N-3). Surface number 4 in the lens data is the image surface.

TABLE 14

(Overall specifications)

ER = 4
B = 31.2
f = 14.8

| Surface number | r | d | nd | vd |
|---|---|---|---|---|
| 1 | −42.3960 | 1.2 | 1.516800 | 64.10 |
| 2 | 16.6258 | 2.6 | 1.713000 | 53.93 |
| 3 | 27.2560 | 3.1 | | |
| 4 Image surface | ∞ | 7.7 | | |
| 5 | −39.4700 | 4.4 | 1.620409 | 60.14 |
| 6 | −17.4140 | 0.2 | | |
| 7 | 246.6220 | 7.0 | 1.620409 | 60.14 |
| 8 | −19.0000 | 1.5 | 1.805182 | 25.41 |
| 9 | −55.6420 | 0.2 | | |
| 10 | 93.5363 | 3.8 | 1.620409 | 60.14 |
| 11 | −93.5363 | 0.2 | 1.527600 | 34.71 |
| 12 (Diffraction surface) | −93.5363 | 0.2 | 1.556900 | 50.17 |
| 13 | −93.5363 | 0.2 | | |
| 14 | 22.5698 | 4.3 | 1.589130 | 61.09 |
| 15 | 530.3439 | 18.9 | | |

(Diffraction surface data)
Twelfth surface

C2 = −7.6919E−04    C4 = 4.1262E−07
C6 = 0.0000E+00     C8 = 0.0000E+00
C10 = 0.0000E+00 fd = 650
Number of diffraction grating grooves 181
Minimum grating pitch 0.037

(Conditional expression values)

DH1H2 = 7.8
DH1 = 8.8
DH2 = 1.0
ra = 12.8

FIG. 21 shows graphs showing various aberrations for the eyepiece system in Example N-3. It is apparent that various aberrations, particularly lateral chromatic aberration, are satisfactorily corrected; and that the eyepiece system in the present example provides exceptional imaging performance.

Example of Binoculars Provided with the Eyepiece System

Figure 22:
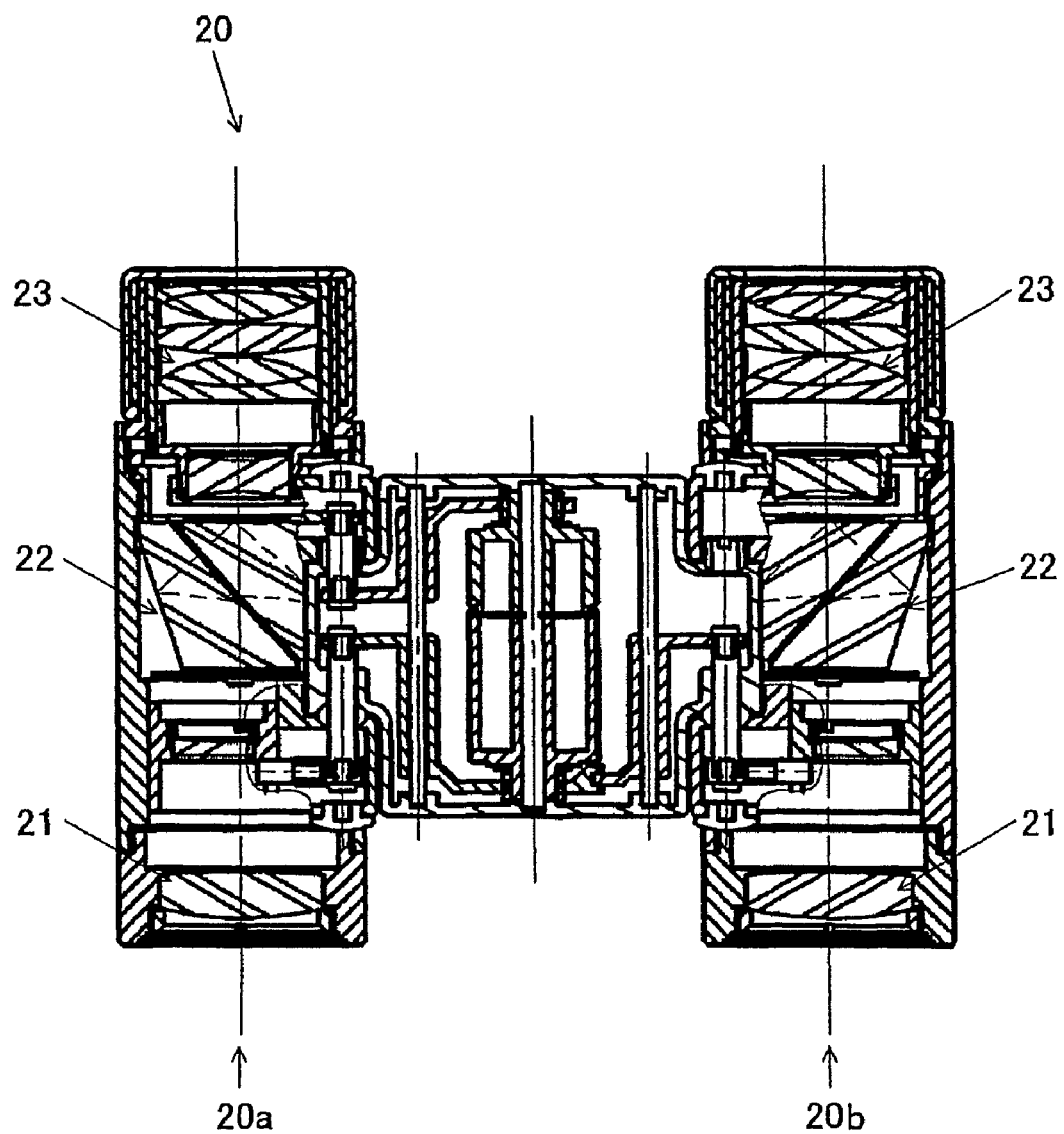
FIG. 22 shows the structure of a pair of binoculars provided with the eyepiece system.

A set of binoculars according to an embodiment of the present invention will next be described based on FIG. 22. FIG. 22 shows the structure of the binoculars according to the present embodiment. The binoculars 20 are provided with the eyepiece system described in the examples above as the eyepieces 23 described hereinafter.

As shown in FIG. 22, the binoculars 20 comprise, in order along the optical axis from the viewing object, an objective 21, an erecting optical system 22, and an eyepiece 23 in each of a pair of left and right viewing lens barrels 20a, 20b that correspond to the left and right eyes of an observer. According to this configuration, light from the viewing object is collected by each of the objectives 21, and an image of an object is formed. The object image is made erect by the erecting optical system 22 and magnified by the eyepieces 23. The observer is thereby able to view a magnified image of the viewing object.

In the present embodiment, the eyepiece system described in the examples above is used for the eyepieces 23. Manufacturing is thereby facilitated, and various aberrations such as lateral chromatic aberration can be satisfactorily corrected.

The binoculars may be provided with the eyepiece system according to any of the examples from the first through fourth groups, i.e., any of Examples 1 through 10 described above, as the eyepieces 23.

A set of binoculars is described as an example of an optical device provided with the eyepiece system in the embodiment described above, but a set of binoculars is not provided by way of limitation to the optical device, it being apparent that the eyepiece system may be applied to a telescope, microscope, or other optical device.

As described above, there can be provided a readily manufactured eyepiece system, and an optical device in which the eyepiece system is used, in which various aberrations such as lateral chromatic aberration are satisfactorily corrected. The above examples are not provided by way of limitation to the present invention; it being apparent that a variety of modifications thereof can be made within the intended scope of the present invention. For example, although a single bonded multi-layer diffraction optical element is included in the above examples, two or more, i.e., a plurality, of bonded multi-layer diffraction optical elements may be provided.

The bonded multi-layer diffraction optical element is incorporated into the eyepiece system in each of the above examples, but this configuration is not provided by way of limitation; the same effect can be obtained by incorporating a separated multi-layer diffraction optical element that has multiple non-bonded layers.

What is claimed is:

1. An eyepiece system comprising:
    a basic lens group in which a lens having a negative refractive power and a lens having a positive refractive power are joined, the basic lens group as a whole having a positive refractive power; and
    at least one diffraction optical element;
    the diffraction optical element including a first diffractive element piece having a first diffractive optical surface, and a second diffractive element piece having a second diffractive optical surface;
    the first diffractive element piece and the second diffractive element piece being arranged so that the first diffractive optical surface and the second diffractive optical surface face each other; and
    the following conditional expressions being satisfied:

when $DH1 \leq DH2$, $DH1/DH1H2 \leq 0.5$ when $DH1 > DH2$, $DH2/DH1H2 \leq 0.5$ where DH1H2 is the absolute value of the distance on an optical axis between a front principal point and a rear principal point of the eyepiece system positioned between an image surface and an eye point;
    DH1 is the absolute value of a distance on the optical axis between a front principal point and the first diffractive optical surface of the eyepiece system positioned between the image surface and the eye point; and DH2 is the absolute value of a distance on the optical axis between a rear principal point and the first diffractive optical surface of the eyepiece system positioned between the image surface and the eye point.

2. The eyepiece system according to claim 1, comprising an additional lens group, the additional lens group including a lens having a positive refractive power.

3. The eyepiece system according to claim 2, characterized in that
the basic lens group is provided as a first lens group;
the additional lens group is provided as a second lens group; and
the first lens group and the second lens group are provided in that order in a direction from the image surface to the eye point.

4. The eyepiece system according to claim 3, characterized in that
a third lens group that comprises a lens having a positive refractive power is further provided on the eye point side of the second lens group.

5. The eyepiece system according to claim 3, characterized in that
a third lens group in which a lens having a positive refractive power and a lens having a negative refractive power are joined is further provided on the eye point side of the second lens group, the third lens group as a whole having a positive refractive power.

6. The eyepiece system according to claim 2, characterized in that
a lens group in which a lens having a negative refractive power and a lens having a positive refractive power are joined is provided as a first lens group, the first lens group as a whole having a negative refractive power;
a lens group that comprises a lens having a positive refractive power is provided as a second lens group;
the basic lens group is provided as a third lens group;
the additional lens group is provided as a fourth lens group;
a further lens group that includes a lens having a positive refractive power is provided as a fifth lens group;
the first to fifth lens groups are arranged in that order in a direction from the image surface to the eye point; and
the image surface is positioned between the first lens group and the second lens group.

7. The eyepiece system according to claim 1, characterized in that the first diffractive optical surface and the second diffractive optical surface are arranged so as to be in contact with each other.

8. The eyepiece system according to claim 1, characterized in that at least one of the first diffractive element piece and the second diffractive element piece comprises a UV-curable resin.

9. The eyepiece system according to claim 1, characterized in that the first diffractive element piece comprises a first UV-curable resin and the second diffractive element piece comprises a second UV-curable resin having different optical characteristics than the first UV-curable resin.

10. The eyepiece system according to claim 1, characterized in that the diffraction optical element satisfies the following conditional expressions:

$$nd1 \leq 1.54$$

$$(nF1-nC1) \geq 0.0145$$

$$nd2 \geq 1.55$$

$$(nF2-nC2) \leq 0.013$$

where $nd1$ is the d-line (wavelength $\lambda=587.562$ nm) refractive index of a material of the diffractive element piece having a lower refractive index and higher dispersion of the two diffractive element pieces in the diffraction optical element;

$nF1$ is the F-line (wavelength $\lambda=486.133$ nm) refractive index of the material of the diffractive element piece having the lower refractive index and higher dispersion of the two diffractive element pieces in the diffraction optical element;

$nC1$ is the C-line (wavelength $\lambda=656.273$ nm) refractive index of the material of the diffractive element piece having the lower refractive index and higher dispersion of the two diffractive element pieces in the diffraction optical element;

$nd2$ is the d-line (wavelength $\lambda=587.562$ nm) refractive index of a material of the diffractive element piece having a higher refractive index and lower dispersion of the two diffractive element pieces in the diffraction optical element;

$nF2$ is the F-line (wavelength $\lambda=486.133$ nm) refractive index of the material of the diffractive element piece having the higher refractive index and lower dispersion of the two diffractive element pieces in the diffraction optical element; and $nC2$ is the C-line (wavelength $\lambda=656.273$ nm) refractive index of the material of the diffractive element piece having the higher refractive index and lower dispersion of the two diffractive element pieces in the diffraction optical element.

11. An optical device comprising the eyepiece system according to claim 1.

* * * * *